United States Patent [19]

Franz et al.

[11] Patent Number: 6,161,083

[45] Date of Patent: Dec. 12, 2000

[54] EXAMPLE-BASED TRANSLATION METHOD AND SYSTEM WHICH CALCULATES WORD SIMILARITY DEGREES, A PRIORI PROBABILITY, AND TRANSFORMATION PROBABILITY TO DETERMINE THE BEST EXAMPLE FOR TRANSLATION

[75] Inventors: Alexander Franz; Keiko Horiguchi, both of Tokyo, Japan

[73] Assignee: Sony Corporation, Tokyo, Japan

[21] Appl. No.: 08/839,989

[22] Filed: Apr. 24, 1997

[30] Foreign Application Priority Data

May 2, 1996 [JP] Japan ..................................... 8-111442

[51] Int. Cl.⁷ ............................. G06F 17/20; G06F 17/27
[52] U.S. Cl. ........................................ 704/4; 704/7; 704/9
[58] Field of Search ................................... 704/2, 3, 4, 5, 704/6, 7, 8, 10; 707/535, 536; 434/156, 157, 167, 169

[56] References Cited

U.S. PATENT DOCUMENTS

| | | | |
|---|---|---|---|
| 4,599,691 | 7/1986 | Sakaki et al. ................................ | 704/2 |
| 4,641,264 | 2/1987 | Nitta et al. .................................. | 704/4 |
| 5,020,021 | 5/1991 | Kaji et al. ................................... | 704/5 |
| 5,268,839 | 12/1993 | Kaji ............................................ | 704/3 |
| 5,495,413 | 2/1996 | Kutsumi et al. ........................... | 704/4 |
| 5,510,981 | 4/1996 | Berger et al. .............................. | 704/2 |
| 5,612,872 | 3/1997 | Fujita ......................................... | 704/2 |
| 5,659,765 | 8/1997 | Nii .............................................. | 704/4 |
| 5,677,835 | 10/1997 | Carbonell et al. .......................... | 704/8 |
| 5,844,798 | 12/1998 | Uramoto ..................................... | 704/2 |
| 5,907,821 | 5/1999 | Kaji et al. ................................... | 704/4 |

FOREIGN PATENT DOCUMENTS

| | | | |
|---|---|---|---|
| 0562818 A2 | 9/1993 | European Pat. Off. ........ | G06F 15/38 |
| 0651340 A2 | 5/1995 | European Pat. Off. ........ | G06F 17/28 |
| 0672989 A2 | 9/1995 | European Pat. Off. ........ | G06F 17/28 |
| 0805403 A2 | 11/1997 | European Pat. Off. . | |
| 3-276367 | 12/1991 | Japan . | |
| 4-188276 | 7/1992 | Japan . | |
| 6-68134 | 3/1994 | Japan . | |
| 6-274546 | 9/1994 | Japan . | |
| 6-274548 | 9/1994 | Japan . | |
| 41-0021243A | 1/1998 | Japan . | |
| 41-0334098A | 12/1998 | Japan . | |
| 41-1039306A | 2/1999 | Japan . | |
| 88/02516 | 4/1988 | WIPO ............................ | G06F 15/38 |

OTHER PUBLICATIONS

Patent Abstracts of Japan, JP 59–032062, Published Feb. 21, 1984, Casio Computer Co. Ltd.

Patent Abstracts of Japan, JP 7–152767, Published Jun. 16, 1995, Kobe Nippon Denki Software KK.

*Primary Examiner*—Joseph Thomas
*Attorney, Agent, or Firm*—Limbach & Limbach LLP

[57] ABSTRACT

A translating apparatus and a translating method wherein a first language sentence is divided into syntax units consisting of predetermined units of sentence structure such as clauses and phrases in stages from large syntax units into small syntax units and at each stage stored examples most similar to these syntax units are detected using probability models taking into account grammatical attributes of the syntax units and of the examples and using generalized linguistic knowledge and with reference to a thesaurus and the syntax units are translated on the basis of these detected examples and the results of translation of the syntax units are compounded to generate a second language sentence. The invention makes it possible to carry out high-quality translating efficiently and therefore at a high processing speed while eliminating the need for many superficially different examples having the same meaning content to be prepared and the need for the thesaurus to be regularly structured or have uniform distances between concepts.

27 Claims, 15 Drawing Sheets

FIG. 8A

| morpheme | part of speech | root | modality case information |
|---|---|---|---|
| DEKIMASHITARA | verb | SURU | potential conditional |
| ICHIGO | noun | | |
| NO | case particle | | |
| AISU KUREEMU | noun | | |
| O | case particle | | |
| ONEGAI SHITAI | verb | ONEGAI SURU | desiderative |
| 'N | case particle | | |
| DESU | auxiliary verb | | |
| GA | conjunction | | |

FIG. 8B

DEKIMASHITARA  X ⟷ X. If possible

FIG. 9A  root 「ONEGAI SURU」 +desiderative
NP1 「AISU KUREEMU O」

FIG. 9B  root 「ONEGAI SURU」 +desiderative
NP1 「TANAKA SAN O」
↕
may I speak to NP1?

FIG. 9C  root 「ONEGAI SURU」 +desiderative
NP1 「KOUHEE O IPPAI」
↕
may I have to NP1?

FIG. 10A  「SAKUJITSU NO GYUUNYUU」 ↔ 「yesterday's milk」
「WATASHI NO HON」 ↔ 「my book」
「KOUHEE NO AISU KUREEMU」 ↔ 「coffee flavored ice cream」

FIG. 10B  「ICHIGO」 ↔ 「strawberry」

FIG. 10B  coffee flavored ice cream
↓
strawberry flavored ice cream

EXAMPLE-BASED TRANSLATION METHOD AND SYSTEM WHICH CALCULATES WORD SIMILARITY DEGREES, A PRIORI PROBABILITY, AND TRANSFORMATION PROBABILITY TO DETERMINE THE BEST EXAMPLE FOR TRANSLATION

BACKGROUND OF THE INVENTION

1. Field of the Invention

This invention relates to a translating apparatus and a translating method, and particularly to a translating apparatus and a translating method for translating a first language sentence expressed in a first language into a second language sentence expressed in a second language using examples.

2. Description of the Related Art

Translating apparatuses for translating a first language sentence expressed in a first language into a second language sentence expressed in a second language can be generally divided into the three classes: rule-driven translation apparatuses, example-using translation apparatuses, and example-driven translation apparatuses.

FIG. 1 shows the construction of an example of a rule-driven translation apparatus. In FIG. 1, an inputting part 1 consists of for example a keyboard or a voice recognition device or a character recognition device; a first language sentence is inputted into it and is converted into a form such as text data and outputted. That is, when the inputting part 1 consists of a keyboard, a first language sentence is inputted by the keyboard being operated and test data corresponding to that operation is outputted. When the inputting part 1 is a voice recognition device, a first language sentence is inputted as voice and voice-recognized. Text data corresponding to the results of the voice recognition is then outputted. When the inputting part 1 is a character recognition device, a first language sentence written for example on paper is inputted (read) and this first language sentence is character-recognized. Text data corresponding to the results of this character recognition is then outputted.

The text data corresponding to the first language sentence outputted from the inputting part 1 is supplied to an analyzing part 31. In the analyzing part 31, the first language sentence from the inputting part 1 is language-processed (analyzed) on the basis of knowledge and rules relating to the first language, and the results of this analysis are supplied to a converting part 32. The converting part 32 converts the analysis results from the analyzing part 31 into an intermediate language sentence of a prescribed intermediate language on the basis of knowledge and rules relating to the first language and a second language, and outputs this to a generating part 33. The generating part 33 generates from the intermediate language sentence supplied from the converting part 32 a corresponding second language sentence, that is, a translation (second language sentence) consisting of the first language sentence translated into the second language, on the basis of knowledge and rules relating to the second language.

An outputting part 16 is made up of for example a display or a voice synthesizing device and a speaker or the like, and displays or outputs in a synthesized voice the second language sentence supplied from the generating part 33.

FIG. 2 shows the construction of an example of an example-using translating apparatus. Parts in the figure corresponding to parts in FIG. 1 have been given the same reference numerals and will not be described in the following. Apart from being provided with a collating part 41 and a replacing part 42, this example-using translating apparatus is of the same construction as the rule-driven translation apparatus of FIG. 1.

In this example-using translating apparatus, examples in sentence units expressed in a first language and corresponding translations consisting of the examples translated into a second language (hereinafter for convenience these examples and their corresponding translations will be called translation example data) are stored for example in the form of parameters, and in the collating part 41 the first language sentence outputted by the inputting part 1 is collated with the examples and any example matching the first language sentence is thereby detected. When there is an example which matches the first language sentence, the collating part 41 controls the replacing part 42 to replace the first language sentence with the translation corresponding to the example matching it. Accordingly, in the replacing part 42, the first language sentence is replaced with the example matching it and supplied to the outputting part 16.

When on the other hand there is no example which matches the first language sentence, the collating part 41 outputs the first language sentence to the analyzing part 31. Thereafter, in the analyzing part 31, the converting part 32 and the generating part 33, the same processing as in the case shown in FIG. 1 is carried out, and the second language sentence obtained as a result is supplied to the outputting part 16.

Details of this kind of example-using translating apparatus are disclosed for example in Japanese Unexamined Patent Publication No. H.6-68134.

Next, FIG. 3 shows the construction of an example of an example-driven translating apparatus. Parts in FIG. 3 the same as parts in FIG. 1 have been given the same reference numerals and will not be described in the following.

In this example-driven translating apparatus, a first language sentence outputted by the inputting part 1 is supplied to a converting part 51, and when the converting part 51 receives the first language sentence from the inputting part 1 it controls a searching part 52 to search for the example most similar to that first language sentence.

That is, translation example data is stored in sentence units in a translation example memory 53, and the searching part 52 first refers to the translation example memory 53 and searches for an example which matches the first language sentence. When it finds an example which matches the first language sentence, the searching part 52 outputs this example and its corresponding translation to the converting part 51. In this case, the converting part 51 supplies the translation from the searching part 52 unchanged to the outputting part 16 as a second language sentence.

When on the other hand it cannot find an example which matches the first language sentence, the searching part 52 successively reads the examples stored in the translation example memory 53 and supplies them to a similarity degree calculating part 54. The searching part 52 makes the similarity degree calculating part 54 calculate a similarity degree expressing the conceptual similarity (the similarity in meaning) between each of the examples and the first language sentence using external knowledge such as for example a thesaurus.

That is, a thesaurus wherein words are classified on the basis of their concepts in a tree structure is stored in a thesaurus memory part 55. In the thesaurus, nodes of the tree structure are equivalent to meaning concepts and so-called leaf parts are equivalent to words. Referring to this thesaurus, the similarity degree calculating part 54 calculates a degree of similarity between the first language sentence and the examples on the basis of the classes to which concepts common to words constituting the first language sentence and words constituting the examples belong. The searching part 52 then finds in the translation example memory 53 the example of which the similarity degree calculated by the similarity degree calculating part 54 is the highest and supplies the translation corresponding to that example to the converting part 51.

When the converting part 51 receives the translation from the searching part 52, it replaces those words of the translation which do not match (correspond with) words of the first language sentence with translations of those words and outputs this to the outputting part 16 as a second language sentence.

Details of this kind of example-driven translating apparatus are disclosed for example in Japanese Unexamined Patent Publication No. H.3-276367. Also, details of methods of calculating the degree of similarity between a first language sentence and an example are also disclosed in for example Japanese Unexamined Patent Publication No. H. 4-188276, Japanese Unexamined Patent Publication No. H. 6-274546 and Japanese Unexamined Patent Publication No. H.6-274548 as well as the aforementioned Japanese Unexamined Patent Publication No. H.3-276367.

However, in the kinds of translating apparatus described above, there have been the following problems.

That is, in rule-driven translation apparatuses there has been the problem that information required for translation is sometimes lost in the process of analysis of the first language sentence, and consequently results of translation of greetings and other set phrases have become word-for-word in tone. Also, when the first language sentence includes for example proverbs or other idiomatic expressions (idioms), translating these correctly has been difficult. Also, building and maintaining as a data base the knowledge and rules relating to the first language and the second language used in rule-driven translation apparatuses has not been easy.

With example-using translating apparatuses, on the other hand, because the first language sentence is translated using a translation corresponding to an example matching it, if greetings and other set phrases and idioms and so on are stored as examples, it is possible to obtain a second language sentence which is a natural expression. However, in an example-using translating apparatus, when no example matching the first language sentence is stored, because processing similar to that of a rule-driven translation apparatus is carried out after all, the kinds of problem mentioned above arise, and furthermore storing examples completely matching the character strings of all first language sentences that might be inputted has been problematic.

In an example-driven translating apparatus, because translation is carried out using examples whatever the nature of the first language sentence, the problems of the rule-driven translation apparatus do not arise, and also it is not necessary to store examples completely matching all possible first language sentences.

However, in an example-driven translating apparatus, when there is no example matching the first language sentence, the example most similar to it is found and those of the words constituting the corresponding translation which do not match words constituting the first language sentence are simply replaced with translations of those words and this becomes the translation result, i.e. the second language sentence. Therefore, in an example-driven translating apparatus, linguistic knowledge and rules are not reflected in a generalized form and consequently the quality of the translation (the accuracy of the translation and the naturalness of the translation result) can only be increased by increasing the number of examples stored in the translation example memory 53 (whereas the quality of the translations of a rule-driven translation apparatus can also be improved through the way in which knowledge and rules relating to the languages are described). Increasing the number of examples stored in the translation example memory 53 increases the time required for the processing of searching for an example matching or similar to the first language sentence.

The calculation of the similarity degree D (I,E) between a first language sentence I and an example phrase E in an example-driven translating apparatus, when the words constituting the first language sentence I are expressed $i_1$, $i_2, \ldots, i_t$ it and the words constituting the example phrase E are expressed $e_1, e_2, 111, e_t$ (where t represents the number of words constituting the first language sentence and the example respectively) has been carried out as shown in Exp. (1) by finding the distance in meaning (the conceptual distance) word-distance($i_k, e_k$) between each word $i_k$ constituting the first language sentence I and the corresponding word $e_k$ in the example phrase E, assigning to it a weight$_k$ corresponding to the importance of the word $e_k$, and obtaining the sum total of these weighted distances.

$$D(I, E) = \sum_{k=1}^{1} \text{word} - \text{distance}(i_k, e_k) \times \text{weight}_k \qquad (1)$$

With this kind of similarity degree calculating method there have been the following kinds of problem.

That is, for example when the meaning content of a certain example is spoken, although sometimes the example itself is spoken, in most cases a word such as the word constituting the subject in the example is omitted or extra words are inserted. With the calculation method described above, because it is presupposed that the first language sentence and the example are -made up of the same number of words, when the numbers of words in the two are different, it has been unclear whether or not it is possible to obtain a similarity degree correctly reflecting the similarity of the example to the first language sentence.

Also, reversely, even if the first language sentence and the example are made up of the same number of words, when their word orders are different, again it has been unclear whether or not it is possible to obtain a similarity degree correctly reflecting the similarity of the example to the first language sentence. That is, if the first language is a language wherein words can be lined up in a relatively free order like for example Japanese, when for example 'RINGO O WATASHI WA TABETAI' ('an apple—I want to eat') is inputted as the first language sentence, even if for example 'WATASHI WA MIKAN O TABETAI' ('I want to eat an orange') is stored as an example, because the 'RINGO' ('apple') and the 'WATASHI' ('I') of the first language sentence respectively correspond to the 'WATASHI' ('I') and the 'MIKAN' ('orange') of the example, recognizing that the two sentences are similar has been problematic.

Also, when for example the inputting part 1 consists of a voice recognition device, it sometimes happens that the speaker does not speak clearly and correct recognition is not achieved in the voice recognition device and text data wherein particles and the like are missing is outputted. That is, it sometimes happens for example that although the first language sentence intended by the speaker was 'WATASHI WA, ANATA NO MIKAN GA TABETAI' ('I want to eat your orange') the output of the inputting part 1 becomes 'WATASHI, ANATA, MIKAN, TABETAI'('I, you, orange, want to eat'). In this kind of case, when for example 'WATASHI WA MIKAN O TABETAI' ('I want to eat an orange') is stored as an example, the similarity degree should be calculated with the compound noun 'ANATA NO MIKAN' ('your orange'), consisting of the 'ANATA' and the 'MIKAN' in the output of the inputting part 1 joined together, being made to correspond with the 'MIKAN' ('orange') in the example, but with a method using Exp. (1) this has been difficult.

To handle an input whose meaning content matches that of an example but which differs from the example as it were superficially, as described above, it is necessary to add examples corresponding to these superficial variations to the translation example memory 53, and as mentioned above this increases the time required for the searching process.

Also, the distance word-distance($i_k, e_k$) between the word $i_k$ and the word $e_k$ has been determined on the basis of the class to which a concept common to the word $i_k$ and the word $e_k$ (the concept which belongs to the lowest class among the concepts including the word $i_k$ and the word $e_k$) belongs in a thesaurus stored in the thesaurus memory part 55. That is, the thesaurus is constructed by for example making the class to which the largest concepts belong the 0th class and then classifying smaller concepts into 1st through 3rd progressively lower classes and classifying words by assigning them to the concepts in the 3rd class to which they correspond, and with reference to this kind of thesaurus it is detected which of the 0th through 3rd classes the lowest concept common to the word $i_k$ and the word $e_k$ belongs (hereinafter for convenience the C in Cth class will be referred to as the level). Then, according to whether that concept belongs to the 0th, the 1st, the 2nd or the 3rd class, the distance word-distance($i_k, e_k$) is determined to be 0, $\frac{1}{3}$, $\frac{2}{3}$ or 1 respectively.

In this case, it is necessary that when the higher classes are seen from the words there are the same number of classes (in the case described above, the four classes of 0th through 3rd) above each word, and therefore the thesaurus as a whole has had to have an as it were regular structure.

Also, because the distance word-distance($i_k, e_k$) between two words is determined on the basis of the level of the class to which the common concept of the two words belongs (because it is determined on the basis of which of the 0th through 3rd classes the class to which concept belongs is), the thesaurus must be so constructed that the distance between two words having a concept belonging to a certain class as their common concept and the distance between two words having a different concept belonging to the same class as their common concept is the same.

FIG. 16 shows an example of a conventional thesaurus wherein concepts of words are classified into three classes, 0th through 2nd. In the figure, the rectangles represent concepts and the circles represent words.

In this kind of thesaurus, the concept C1 common to the words Wa and Wb is different from the concept C2 common to the words Wc and Wd, but since the concepts C1 and C2 both belong to the 1st class, according to the method of calculating the distance word-distance($i_k, e_k$) of the related art described above, the distance between the words Wa and Wb and the distance between the words Wc and Wd are the same. This means that the distance in meaning between concepts connected by lines is the same between any two concepts, and therefore it has been necessary for the thesaurus to be so constructed that this is the case.

However, constructing a thesaurus regularly and also so that the distance between concepts is the same, as described above, although it may be possible with a small-scale thesaurus, is very difficult in a thesaurus of any substantial size. That is, if the thesaurus is constructed regularly it is difficult to make the distance between concepts fixed, and if the thesaurus is constructed so that the distance between concepts is fixed it becomes difficult to maintain its regularity.

Therefore, a way of making possible high-quality translation using a non-regular thesaurus or a thesaurus wherein the distance between concepts is not fixed has been being sought.

SUMMARY OF THE INVENTION

It is therefore an object of the present invention to overcome the problems described above and provide a translating apparatus and a translating method with which it is possible to carry out high-quality translation easily.

To achieve the aforementioned object and other objects, the invention provides a translating apparatus for translating a first language sentence expressed in a first language into a second language sentence expressed in a second language comprising dividing means for dividing the first language sentence into syntax units consisting of predetermined units of sentence structure, detecting means for detecting examples similar to the syntax units of the first language sentence outputted from the dividing means, translating means for translating the first language sentence in syntax units on the basis of translations corresponding to the examples detected by the detecting means, and generating means for generating a second language sentence by compounding the results of translation of the syntax units obtained by the translating means.

The invention also provides a translating method comprising a step of dividing a first language sentence into syntax units consisting of predetermined units of sentence structure, a step of detecting examples similar to the syntax units of the first language sentence, a step of translating the first language sentence in syntax units on the basis of translations corresponding to the detected examples, and a step of generating a second language sentence by compounding the results of translation of those syntax units.

The invention also provides a translating method comprising a step of dividing a first language sentence into syntax units consisting of predetermined units of sentence structure in stages from large syntax units to small syntax units and collating the syntax units obtained at each stage and examples, a step of detecting examples corresponding to the syntax units on the basis of results of the collation, a step of translating the first language sentence in syntax units on the basis of translations corresponding to those detected examples, and a step of generating a second language sentence by compounding the results of translation of those syntax units.

The invention also provides a translating apparatus comprising calculating means for calculating a word similarity degree expressing the similarity between a word constituting a first language sentence and a word constituting an example on the basis of the number of words included in a concept common to the word constituting the first language sentence and the word constituting the example in a thesaurus wherein words are classified in a tree structure on the basis of their concepts.

The invention also provides a translating method comprising a step of calculating a word similarity degree expressing the similarity between a word constituting a first language sentence and a word constituting an example on the basis of the number of words included in a concept common to the word constituting the first language sentence and the word constituting the example in a thesaurus wherein words are classified in a tree structure on the basis of their concepts.

The invention also provides a translating apparatus comprising detecting means for detecting an example similar to a first language sentence on the basis of a priori probability of the example being used for translating the first language sentence and a transformation probability of the example being transformed into the first language sentence and used and translating means for translating the first language sentence on the basis of a translation corresponding to the example detected by the detecting means.

The invention also provides a translating method comprising a step of detecting an example similar to a first language sentence on the basis of a priori probability of the example being used for translating the first language sentence and a transformation probability of the example being transformed into the first language sentence and used and a step of translating the first language sentence on the basis of a translation corresponding to that detected example.

The invention also provides a translating apparatus comprising extracting means for by performing syntax analysis on a first language sentence extracting grammatical attributes of the first language sentence and detecting means for detecting an example similar to the first language sentence taking into account grammatical attributes of the first language sentence and of the example and translating means for translating the first language sentence on the basis of a translation corresponding to the example detected by the detecting means.

The invention also provides a translating method comprising a step of by performing syntax analysis of a first language sentence extracting grammatical attributes of the first language sentence and a step of detecting an example similar to the first language sentence taking into account grammatical attributes of the first language sentence and of the example and a step of translating the first language sentence on the basis of a translation corresponding to the example detected by the detecting means.

BRIEF DESCRIPTION OF THE DRAWINGS

FIGS. 8A and 8B are further views illustrating the operation of the translating apparatus of FIG. 5;

FIGS. 9A through 9C are further views illustrating the operation of the translating apparatus of FIG. 5;

FIGS. 10A through 10C are further views illustrating the operation of the translating apparatus of FIG. 5;

DETAILED DESCRIPTION OF THE PREFERRED EMBODIMENTS

Figure 1:
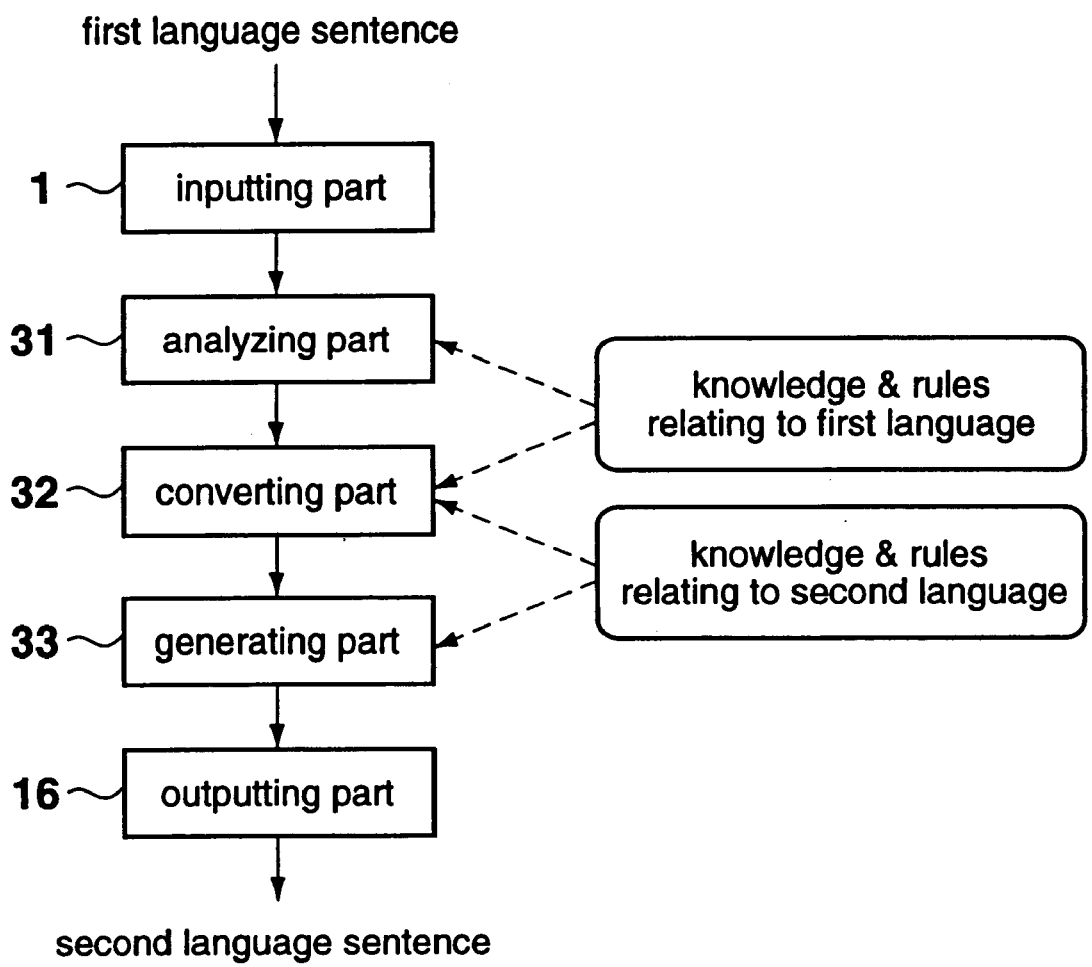
FIG. 1 is a block diagram showing the construction of an example of a translating apparatus of the related art.
Figure 2:
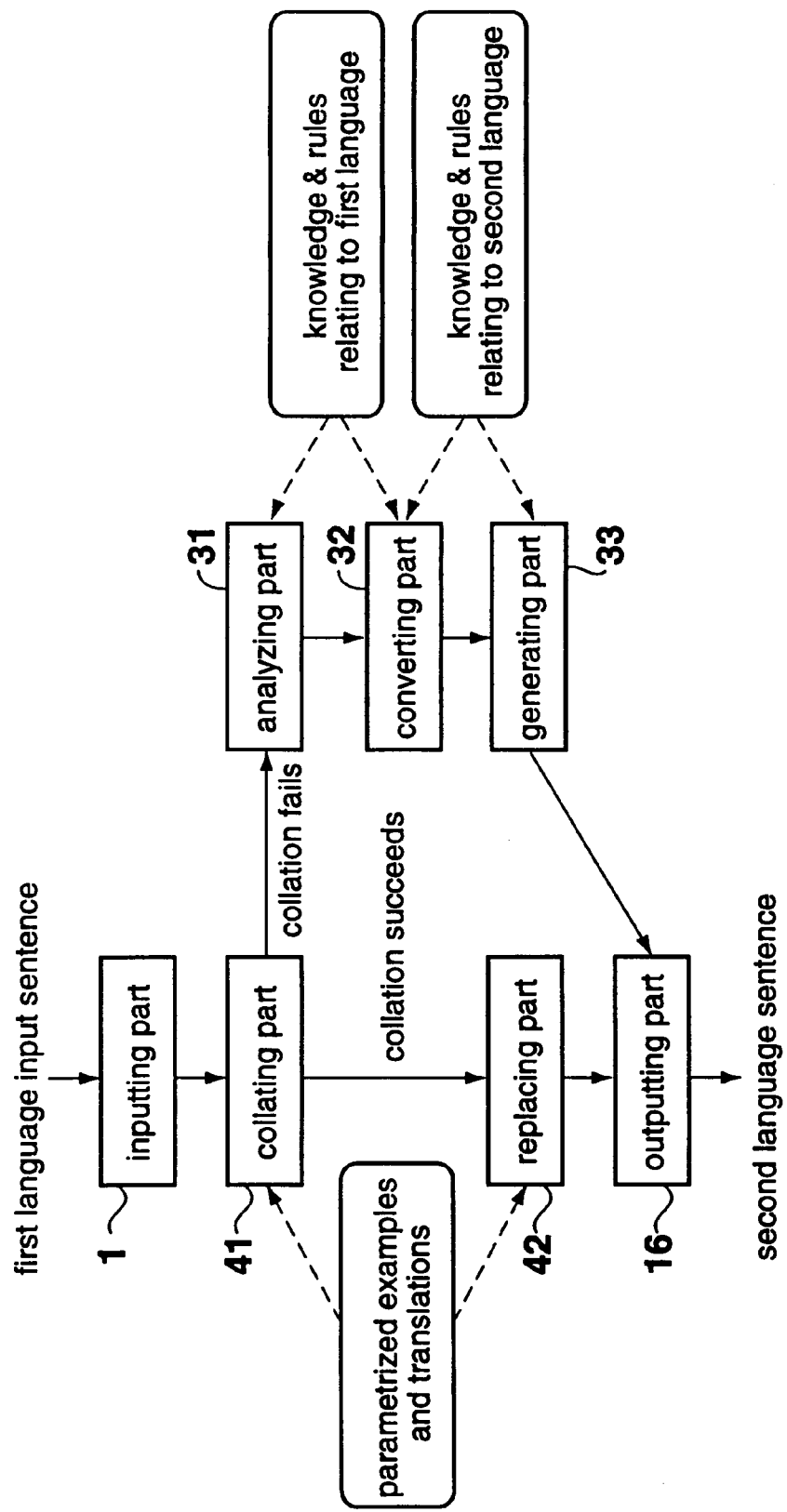
FIG. 2 is a block diagram showing the construction of another example of a translating apparatus of the related art.
Figure 3:
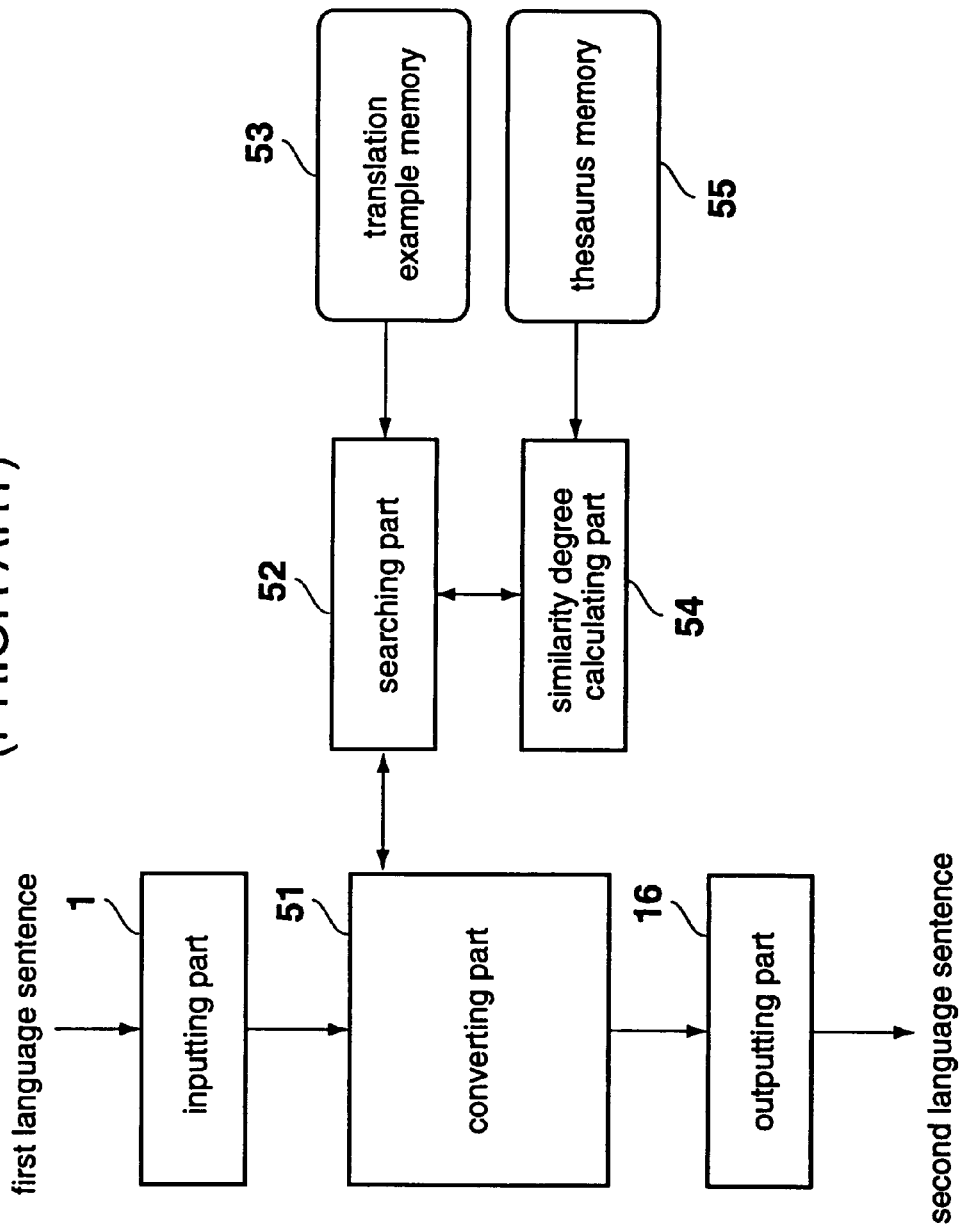
FIG. 3 is a block diagram showing the construction of another example of a translating apparatus of the related art.
Figure 5:
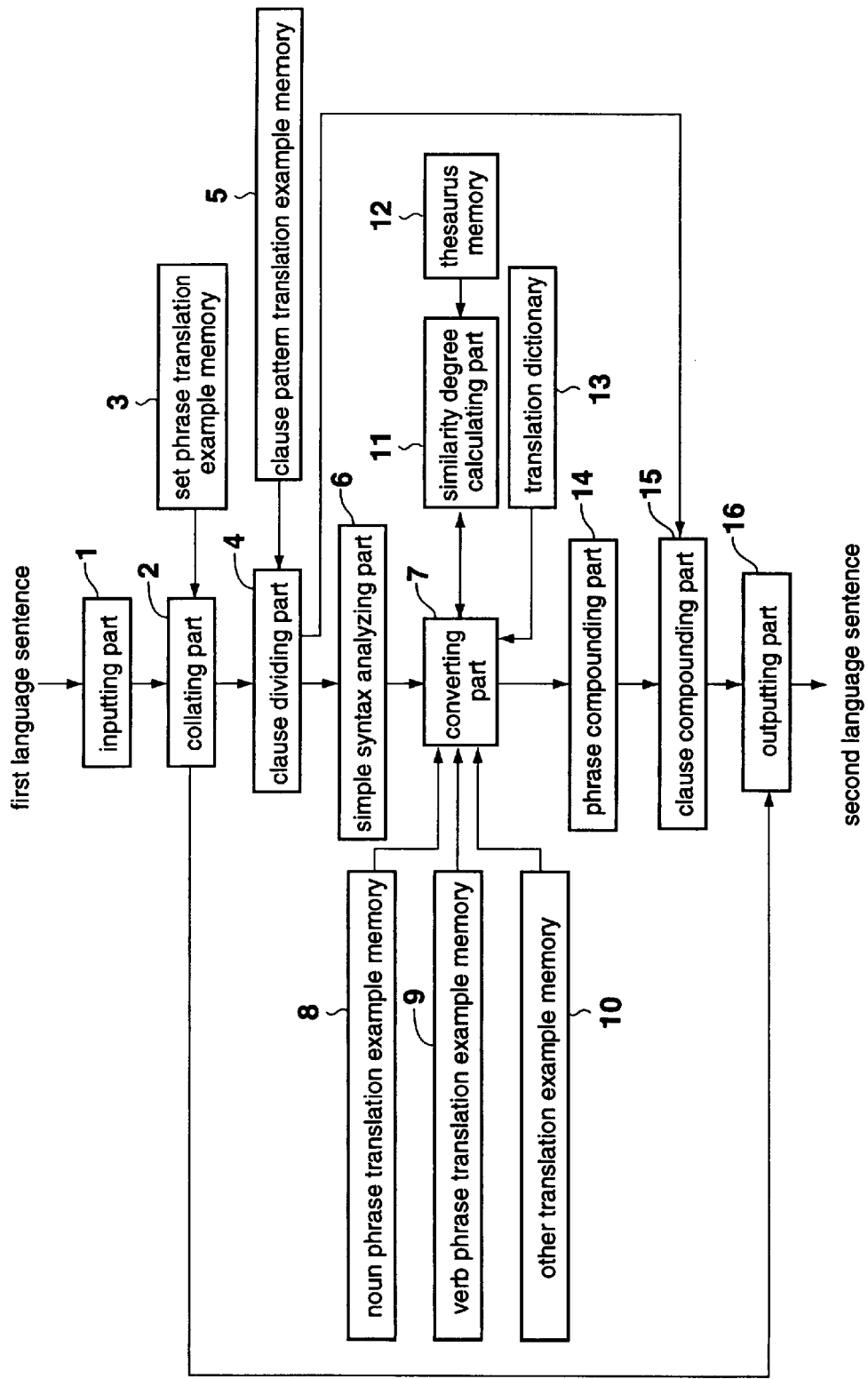
FIG. 5 is a block diagram showing an example of the construction of a preferred embodiment of a translating apparatus according to the invention.

FIG. 5 shows the construction of a preferred embodiment of a translating apparatus according to the invention. Parts in FIG. 5 corresponding to parts shown in FIG. 1 have been given the same reference numerals and will not be described in the following. This translating apparatus, as will be further discussed later, divides a first language sentence into syntax units consisting of predetermined units of sentence structure, in stages, first into large syntax units and then into small syntax units, and translates the syntax units obtained at each stage using examples, and in this sense it can be called a multi-stage example-using translating apparatus. Here, as the first language sentence for example a Japanese sentence is inputted, and as a second language sentence constituting the result of translation of the first language sentence for example an English sentence is outputted.

An inputting part 1 of this translating apparatus, like the inputting part mentioned above, consists of for example a keyboard or a voice recognition device or a character recognition device, and outputs in the form of text data or the like a first language sentence inputted into it. Here, the inputting part 1 detects the beginning and end of each word (or morpheme) constituting the first language sentence, and its part of speech, root and Chinese character reading and so on (hereinafter, this information obtained by morpheme analysis will for convenience be called morpheme information), and outputs these in the form of text data together with the first language sentence.

The output of the inputting part 1 is supplied to a collating part 2. The collating part 2 collates examples stored in a set phrase translation example memory 3 with the first language sentence from the inputting part 1 and determines whether or not there is among the examples stored in the set phrase translation example memory 3 one which matches the first language sentence. When an example which matches the first language sentence from the inputting part 1 is stored in the set phrase translation example memory 3, the collating part 2 reads from the set phrase translation example memory 3 a translation corresponding to this example and supplies it to an outputting part 16. Thus, in this case, processing is not carried out in subsequent stages of a clause dividing part 4 through to a clause compounding part 15. The translation from the collating part 2 is outputted by the outputting part 16 as the second language sentence.

When no example matching the first language sentence from the inputting part 1 is stored in the set phrase translation example memory 3, the collating part 2 outputs the first language sentence from the inputting part 1 and its morpheme information to a clause dividing part 4.

The set phrase translation example memory 3 stores translation example data made up of examples of for instance greetings and other so-called set phrases expressed in the first language (here, as mentioned above, Japanese) and corresponding translations consisting of these examples translated into the second language (here, as mentioned above, English). Therefore, when the first language sentence is a set phrase (a set phrase stored as an example in the set phrase translation example memory 3), the translation corresponding to the example matching that set phrase is supplied from the collating part 2 to the outputting part 16, and when the first language sentence is not a set phrase this first language sentence and its morpheme information is supplied from the collating part 2 to the clause dividing part 4.

When it receives the first language sentence and the morpheme information from the collating part 2, the clause dividing part 4 determines whether or not there is in the first language sentence a clause matching any of the examples stored in a clause division pattern translation example memory 5, and when there is such a clause in the first language sentence cuts the first language sentence at this clause and thereby divides the first language sentence into clauses, or large syntax units. The clause dividing part 4 supplies parts of the result (clauses) of the division of the first language sentence other than the clause which matches one of the examples stored in the clause division pattern translation example memory 5 to a simple syntax analyzing processing part 6 together with the morpheme information. Also, the clause dividing part 4 reads from the clause division pattern translation example memory 5 the translation corresponding to the example matching the clause used to divide up the first language sentence and supplies this together with information relating to how the first language sentence was divided up thereinafter referred to for convenience as clause division information) to the clause compounding part 15.

When on the other hand there is in the first language sentence no clause matching an example stored in the clause division pattern translation example memory 5, that is, when the first language sentence consists of a single clause, the clause dividing part 4 supplies the first language sentence unchanged to the simple syntax analyzing processing part 6 together with its morpheme information.

The clause division pattern translation example memory 5 stores translation example data made up of examples in clause units expressed in the first language and corresponding translations consisting of these examples translated into the second language. Here, examples of so-called patterned clauses such as for example 'DEKITARA' ('if possible') are stored in the clause division pattern translation example memory 5.

The simple syntax analyzing processing part 6, by carrying out so-called shallow syntax analysis on a clause constituting the first language sentence from the clause dividing part 4 on the basis of the morpheme information also from the clause dividing part 4, for example using language-governing rules (knowledge) described as regular grammar, divides the clause (when a plurality of clauses are supplied from the clause dividing part 4, each of the clauses) into phrase units. That is, here, the simple syntax analyzing processing part 6 divides up the first language sentence clause from the clause dividing part 4 into for example noun phrases, verb phrases and other phrases (for example adverb phrases and sentence modifiers and so on), and supplies these to a converting part 7.

The simple syntax analyzing processing part 6, by carrying out syntax analysis, also carries out extraction of grammatical attributes for each phrase, such as for example syntactic head (the main word of the phrase (for example the important part of a noun phrase (a modified word or the like) or when a noun phrase consists of a single noun, that noun) and modality (for example information relating to potential, conditional, desiderative and so on). Also, the simple syntax analyzing processing part 6 detects linkage relationships between phrases constituting the clause, and other syntax information (hereinafter called clause syntax information). The grammatical attributes and clause syntax information are supplied to the converting part 7 together with the phrases obtained as described above.

The converting part 7 detects phrase unit examples most similar to the phrases of the first language sentence from the simple syntax analyzing processing part 6 from a noun phrase translation example memory 8, a verb phrase translation example memory 9 and an other translation example memory 10, and carries out translation in phrase units on the basis of translations corresponding to these examples.

That is, the converting part 7 controls a similarity degree calculating part 11 to calculate word similarity degrees expressing the similarity in meaning between the words in the examples stored in the noun phrase translation example memory 8, the verb phrase translation example memory 9 or the other translation example memory 10 and the words constituting the phrases from the simple syntax analyzing processing part 6, and on the basis of these word similarity degrees and other parameters (for example the grammatical attributes outputted by the simple syntax analyzing processing part 6) detects the examples most similar to the phrases from the simple syntax analyzing processing part 6. In the converting part 7, when an example matching a phrase from the simple syntax analyzing processing part 6 is stored in the noun phrase translation example memory 8, the verb phrase translation example memory 9 or the other translation example memory 10, this example is detected as the example most similar to the phrase from the simple syntax analyzing processing part 6.

Also, by referring to a translation dictionary 13, the converting part 7 replaces those of the words constituting the translation corresponding to the most similar example thus detected which do not correspond to words constituting the first language sentence with translations of those words, and outputs translations of phrases obtained in this way to a phrase compounding part 14 together with the clause syntax information from the simple syntax analyzing processing part 6.

The converting part 7 carries out the processing described above for each noun phrase, verb phrase and other phrase supplied from the simple syntax analyzing processing part 6. Detection of the phrase unit example most similar to a noun phrase, a verb phrase or an other phrase is carried out with reference respectively only to the noun phrase translation example memory 8, the verb phrase translation example memory 9 or the other translation example memory 10.

The noun phrase translation example memory 8, the verb phrase translation example memory 9 and the other translation example memory 10 respectively store examples in noun phrase units, verb phrase units and other phrase units.

The similarity degree calculating part 11, under the control of the converting part 7, on the basis of a thesaurus stored in a thesaurus memory 12, calculates degrees of similarity between the words constituting the examples stored in the noun phrase translation example memory 8, the verb phrase translation example memory 9 or the other translation example memory 10 and the words constituting the phrases outputted by the simple syntax analyzing processing part 6. The thesaurus memory 12 stores a thesaurus wherein words are classified in a tree structure on the basis of their concepts. The translation dictionary 13 stores words of the first language in association with corresponding words of the second language (words of the first language translated into the second language (translations)).

The phrase compounding part 14, by compounding the translations of noun phrases, verb phrases and other phrases supplied from the converting part 7 on the basis of the clause syntax information also supplied from the converting part 7 and language-governing rules of the second language, produces clauses of the second language and supplies them to the clause compounding part 15. The clause compounding part 15 compounds the clauses and thereby produces a second language sentence constituting the result of translation of the first language sentence.

That is, when the first language sentence is made up of a plurality of clauses, results of translation of a plurality of clauses are supplied to the clause compounding part 15 from the phrase compounding part 14. Also, a result of translation of a clause may be supplied to the clause compounding part 15 not only from the phrase compounding part 14 but also from the clause dividing part 4. By compounding (combining) the results of translation of a plurality of clauses supplied to it in this way the clause compounding part 15 produces a second language sentence. The second language sentence produced by the clause compounding part 15 is supplied to the outputting part 16 and outputted.

From the clause dividing part 4, as mentioned above, besides a result of translation (a translation) of a clause, clause division information is also supplied to the clause compounding part 15, and the translations of clauses outputted by the phrase compounding part 14 are compounded with the translation of the clause outputted by the clause dividing part 4 on the basis of this clause division information.

Figure 6:
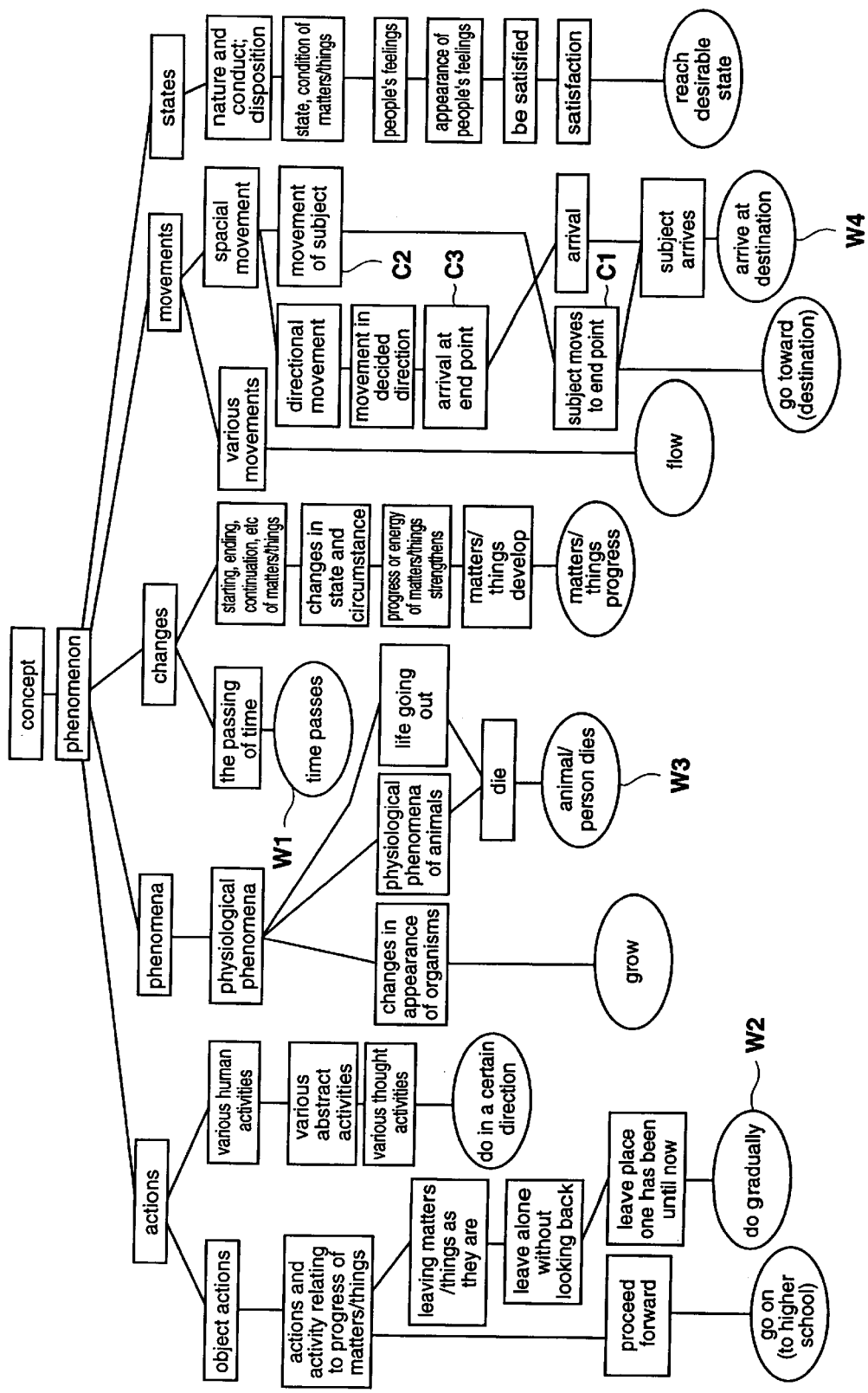
FIG. 6 is a view showing a thesaurus stored in a thesaurus memory 12 of FIG. 5.

Next, with reference to FIG. 6, the thesaurus stored in the thesaurus memory 12 will be described. In the thesaurus memory 12 is stored a thesaurus wherein words are classified in the same way as in for example the EDR (Japan Electronic Dictionary Research Institute) concept dictionary, and FIG. 6 shows a part of this thesaurus (Source: 'Japan Electronic Dictionary Research Institute, EDR Electronic Dictionary Product Edition (10th Edition), 1995'). That is, FIG. 6 shows those words (enclosed by ellipses in the figure) in the thesaurus stored in the thesaurus memory 12 which can be expressed as 'go' (in the figure not the words themselves but rather their senses are shown), and their higher concepts (enclosed by rectangles in the figure).

This thesaurus is not so constructed that when the classes above are seen from the words there are the same number of classes above each word. That is, when for example as in the case shown in FIG. 4 the class to which the highest concept belongs is made the 0th class and the classes below it are successively called the 1st class, the 2nd class, and so on, the word W1 having the meaning (sense) 'time passes' belongs to the 3rd-class concept of 'the passing of time' and the word W2 having the meaning 'do gradually' belongs to the 7th-class concept of 'leave the place one has been until now'. Also, in this thesaurus, for example the word W3 having the meaning 'animal/person dies' and the word W4 having the meaning 'arrive at destination' are included in a plurality of concepts in the same class. That is, the word W3 is included in both of the 4th-class concepts of 'physiological phenomena of animals' and 'life going out', and the word W4 is included in both of the 7th-class concepts of 'subject moves to end point' and 'arrival'.

Thus, this thesaurus is not constructed regularly.

Also, this thesaurus is not so constructed that the distances between concepts joined by lines are the same. That is, for example the concept C1 ('subject moves to end point') is connected to both the concepts C2 ('movement of subject') and C3 ('arrival at end point'), but the distance between the concepts C1 and C2cannot be said to be the same as the distance between the concepts C1 and C3.

Figure 4:
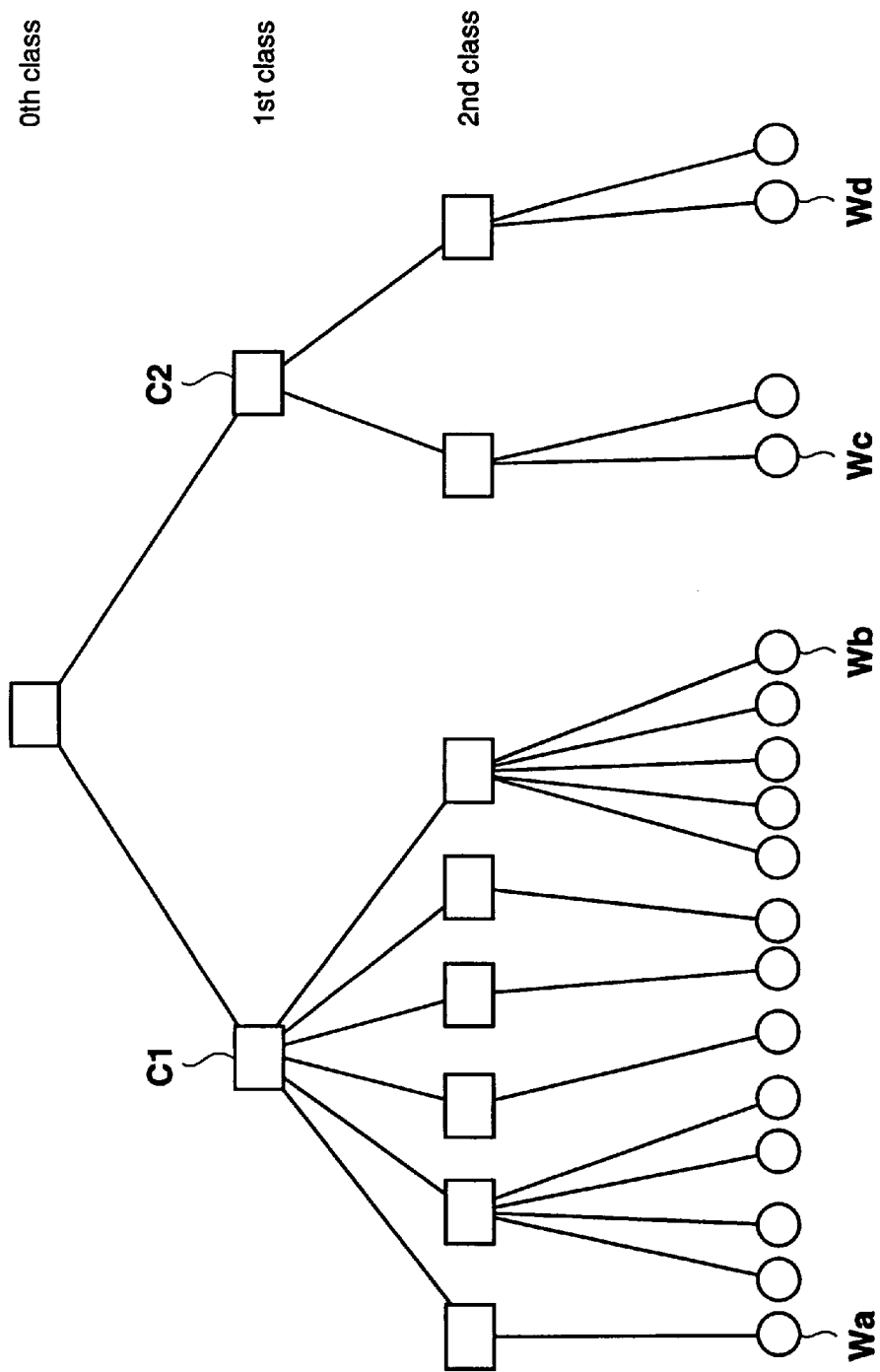
FIG. 4 is a view showing a thesaurus used in a translating apparatus of the related art.

In the similarity degree calculating part 11 of FIG. 4, as will be further discussed later, word similarity degrees accurately reflecting similarities between words are calculated notwithstanding that the thesaurus is constructed in the way described above.

Figure 7:
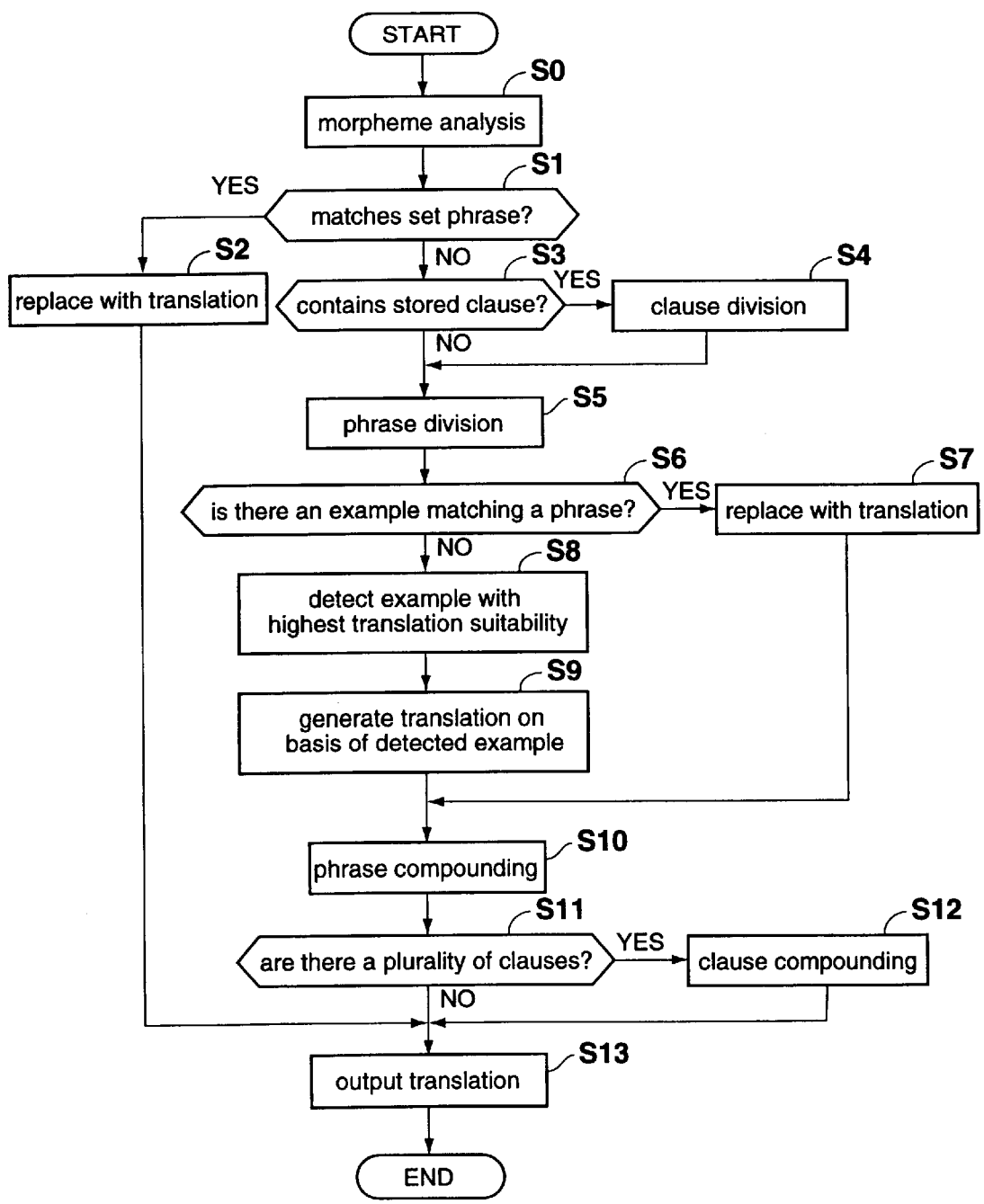
FIG. 7 is a flow chart illustrating the operation of the translating apparatus of FIG. 5.

Next, with reference to the flow chart of FIG. 7, the operation of the translating apparatus shown in FIG. 5 will be described. When a first language sentence is inputted into the inputting part 1, in a step S0, the inputting part 1 converts this first language sentence into text data and generates morpheme information of the first language sentence and supplies these to the collating part 2. In a step S1, the collating part 2 collates the examples stored in the set phrase translation example memory 3 with the first language sentence from the inputting part 1 and thereby determines whether or not there is an example stored in the set phrase translation example memory 3 which matches the first language sentence from the inputting part 1.

When in the step S1 it is determined that there is an example matching the first language sentence from the inputting part 1 stored in the set phrase translation example memory 3, processing proceeds to a step S2 wherein the first language sentence is replaced with the translation corresponding to this matching example and then proceeds to a step S13. In the step S13, the translation obtained in the step S1 is supplied from the collating part 2 to the outputting part 16,which then outputs a second language sentence consisting of the first language sentence translated into the second language, and processing ends.

When on the other hand it is determined in the step S1 that there is no example stored in the set phrase translation example memory 3 which matches the first language sentence from the inputting part 1, this first language sentence is supplied together with its morpheme information from the collating part 2 to the clause dividing part 4. Then, in the clause dividing part 4, in a step S3, it is determined whether or not there is among the clauses constituting the first language sentence a clause which matches one of the clause unit examples stored in the clause pattern translation example memory 5.

When in the step S3 it is determined that among the clauses constituting the first language sentence there is one which matches a clause unit example stored in the clause pattern translation example memory 5, processing proceeds to a step S4 and the clause dividing part 4 cuts the first language sentence at that clause, thereby dividing the first language sentence into clause units, and generates clause division information. The clause dividing part 4 then reads from the clause pattern translation example memory 5 the translation of the clause among the clauses constituting the first language sentence which matches a clause unit example stored in the clause pattern translation example memory 5, and outputs this translation to the clause compounding part 15 together with the clause division information. Also, the clause dividing part 4 supplies the remaining clauses constituting the first language sentence to the simple syntax analyzing part 6 together with the morpheme information, and processing then proceeds to a step S5.

When on the other hand it is determined in the step S3 that there is among the clauses constituting the first language sentence no clause which matches a clause unit example stored in the clause pattern translation example memory 5, that is, when for example the first language sentence is made up of a single clause, the clause dividing part 4 outputs the first language sentence to the simple syntax analyzing part 6 together with the morpheme information and processing skips the step S4 and proceeds to the step S5.

In the step S5, in the simple syntax analyzing part 6, syntax analysis is carried out on clauses constituting the first language sentence from the clause dividing part 4 on the basis of morpheme information also from the clause dividing part 4 and using language-governing rules (knowledge) of the first language, and as a result of this analysis the clauses of the first language sentence are divided into noun phrases, verb phrases and other phrases, and grammatical attributes of each phrase and clause syntax information such as linkage relationships between phrases constituting the clauses are generated. The phrases, the grammatical attributes and the clause syntax information are then supplied from the simple syntax analyzing part 6 to the converting part 7 and processing proceeds to a step S6.

In the step S6, in the converting part 7, each of the phrases supplied from the simple syntax analyzing part 6 and the stored content of the noun phrase translation example memory 8, the verb phrase translation example memory 9 or the other translation example memory 10 are collated and it is thereby determined whether or not a phrase unit example matching a phrase supplied from the simple syntax analyzing part 6 is stored in the noun phrase translation example memory 8, the verb phrase translation example memory 9 or the other translation example memory 10. When in the step S6 it is determined that an example matching a phrase supplied from the simple syntax analyzing part 6 is stored in the noun phrase translation example memory 8, the verb phrase translation example memory 9 or the other translation example memory 10, processing proceeds to a step S7 and the converting part 7 reads a translation corresponding to this matching example from the noun phrase translation example memory 8, the verb phrase translation example memory 9 or the other translation example memory 10 and outputs it to the phrase compounding part 14, and processing then proceeds to a step S10.

Here, noun phrases, verb phrases and other phrases for example obtained from the simple syntax analyzing part 6 by sentence unit examples being inputted into the inputting part 1 are respectively stored in the noun phrase translation example memory 8, the verb phrase translation example memory 9 and the other translation example memory 10. Also, the noun phrases, verb phrases and other phrases obtained in this are stored in association with corresponding grammatical attributes.

That is, phrase unit examples are stored in the noun phrase translation example memory 8, the verb phrase translation example memory 9 and the other translation example memory 10 together with as it were abstract attributes thereof obtained as a result of syntax analysis, called grammatical attributes. Therefore, the converting part 7 can be given generalized linguistic knowledge and made to perform collation of phrases from the simple syntax analyzing part 6 (hereinafter for convenience called input phrases) with the phrases stored in the noun phrase translation example memory 8, the verb phrase translation example memory 9 or the other translation example memory 10 (hereinafter for convenience called example phrases) taking into consideration grammatical attributes of the phrases (grammatical attributes of the input phrases and of the example phrases), and efficient processing becomes possible as a result.

Specifically, when for example the verb phrase 'YOYAKU O SHITE ITADAKITAI NO DESU GA' ('I'd like you to make a reservation') has been inputted into the simple syntax analyzing part 6, as grammatical attributes (or 'slot-name values') for example (gerund-suffix ITADAKU) (desiderative+) (extended-predicate+) (s-part GA) and (formal+) are obtained. Here, the most concise expression (as it were, the expression equivalent to a root) of the verb phrase 'YOYAKU O SHITE ITADAKITAI NO DESU GA' is 'YOYAKU O SURU' ('to make a reservation'), and the slot-name value (gerund-suffix ITADAKU) means that 'ITADAKU' has been added like a suffix to this 'YOYAKU O SURU', the slot-name value (desiderative+) means that an expression expressing desire (here, 'TAI') has been added, the slot-name value (extended-predicate+) means that an expression for adding a predicate (here, 'NO DESU') has been added, the slot-name value (s-part GA) means that an ending particle (here, 'GA') has been added, and the slot-name value (formal+) means that the sentence ending is polite (here, that 'NO DESU' has been used as the sentence ending and not for example the less polite 'NO DA').

In this case, as generalized linguistic knowledge, for example the knowledge that the 'NO' of the expression corresponding to the slot-name value (extended-predicate+) sometimes becomes "N' is given to the simple syntax analyzing part 6, and when for example 'YOYAKU O SHITE ITADAKITAI 'N DESU GA' (also meaning 'I'd like you to make a reservation'), wherein the 'NO' in the verb phrase mentioned above has become "N', is inputted as an input phrase, again the same slot-name values as in the case above of (gerund-suffix ITADAKU) (desiderative+) (extended-predicate+) (s-part GA) and (formal+) are outputted.

Therefore, if the verb phrase 'YOYAKU O SHITE ITADAKITAI NO DESU GA' is stored together with its slot-name values as an example phrase in the verb phrase translation example memory 9, in the converting part 7 the example phrase 'YOYAKU O SHITE ITADAKITAI NO DESU GA' is determined to match the input phrase 'YOYAKU O SHITE ITADAKITAI 'N DESU GA'.

Also, when 'YOYAKU O SHITE ITADAKITAI GA' (still meaning 'I'd like you to make a reservation') consisting of the first-mentioned verb phrase 'YOYAKU O SHITE ITADAKITAI NO DESU GA' with the expressions corresponding to the slot-name values (extended-predicate+) and (formal+) omitted is inputted as an input phrase, the slot-name values (gerund-suffix ITADAKU) (desiderative+) (s-part GA) are outputted by the simple syntax analyzing part 6.

Now, let it be supposed that for example the knowledge that expressions corresponding to the slot-name values (extended-predicate+) and (formal+) can be ignored has been given to the converting part 7 as generalized linguistic knowledge. Then, assuming that the first-mentioned verb phrase 'YOYAKU O SHITE ITADAKITAI NO DESU GA' is stored together with its slot-name values as an example phrase in the verb phrase translation example memory 9, in the converting part 7 collation is carried out ignoring the (extended-predicate+) and (formal+) among the slot-name values of the example phrase 'YOYAKU O SHITE ITADAKITAI NO DESU GA', and as a result the example phrase 'YOYAKU O SHITE ITADAKITAI NO DESU GA' is determined to match the input phrase 'YOYAKU O SHITE ITADAKITAI GA'.

In this way, even if an input phrase does not match an example phrase completely it is possible to obtain an example phrase expressing the same meaning as the input phrase. That is, by taking grammatical attributes into consideration, it is possible to carry out processing in the converting part 7 ignoring the 'NO DESU' in the example phrase.

Also, as a result of this, it becomes unnecessary to provide example phrases corresponding to superficial variations; that is, it becomes unnecessary to store in the verb phrase translation example memory 9 as example phrases in addition to the verb phrase 'YOYAKU O SHITE ITADAKITAI NO DESU GA' the verb phrase 'YOYAKU O SHITE ITADAKITAI GA' with the 'NO DESU' removed, the verb phrase 'YOYAKU O SHITE ITADAKITAI DESU GA' with the 'NO' removed or the verb phrase 'YOYAKU O SHITE ITADAKITAI 'N DESU GA' wherein the 'NO' has been changed to "N', and therefore example phrases can be stored in the noun phrase translation example memory 8, the verb phrase translation example memory 9 and the other translation example memory 10 efficiently. Also, the noun phrase translation example memory 8, the verb phrase translation example memory 9 and the other translation example memory 10 can be called a data base of example phrases, and when the approach described above is adopted it becomes possible to carry out the production, maintenance and improvement of this data base easily.

When on the other hand it is determined in the step S6 that no example phrase in the noun phrase translation example memory 8, the verb phrase translation example memory 9 or the other translation example memory 10 matches an input phrase (a phrase supplied from the simple syntax analyzing part 6), processing proceeds to a step S8 and the converting part 7, by controlling the similarity degree calculating part 11, causes word similarity degrees to be calculated and on the basis of these word similarity degrees and other parameters computes translation suitabilities, which will be further discussed later, expressing the similarity (in meaning) between the input phrase and each of the example phrases stored in the noun phrase translation example memory 8, the verb phrase translation example memory 9 or the other translation example memory 10. The converting part 7 then detects the example phrase of which the translation suitability is the highest and processing proceeds to a step S9.

In the step S9, the converting part 7 produces a translation (hereinafter for convenience called an input phrase translation) of the input phrase on the basis of the translation corresponding to the example phrase detected in the step S8 and with reference to the translation dictionary 13, and outputs it to the phrase compounding part 14 together with the clause syntax information from the simple syntax analyzing part 6.

Here, the processing of the aforementioned steps S6 through S9 is carried out with respect to the example phrases stored in either the noun phrase translation example memory 8, the verb phrase translation example memory 9 or the other translation example memory 10, depending on whether the input phrase is a noun phrase, a verb phrase or an other phrase respectively. Therefore, because the example phrases that are made objects of processing are limited according to the type of the input phrase, it is possible to increase the translation processing speed.

When the phrase compounding part 14 has received translations (input phrase translations) of all the input phrases constituting a certain clause, in a step S10 it generates a clause of the second language by compounding these input phrases on the basis of clause syntax information also supplied from the converting part 7 and supplies it to the clause compounding part 15.

After that, processing proceeds to a step S11 and the clause compounding part 15 determines whether or not the first language sentence is made up of a plurality of clauses. When in the step S11 it is determined that the first language sentence is made up of a plurality of clauses, that is, when a plurality of clauses (second language clauses) have been supplied to the clause compounding part 15 from the phrase compounding part 14, or when clauses have been supplied to the clause compounding part 15 from both the clause dividing part 4 and the phrase compounding part 14, processing proceeds to a step S12 and the clause compounding part 15 generates a second language sentence by compounding these clauses and supplies it to the outputting part 16, and then processing proceeds to a step S13.

When in the step S11 it is determined that the first language sentence is not made up of a plurality of clauses, That is, when only one clause has been supplied to the clause compounding part 15 from the phrase compounding part 14, the clause compounding part 15 supplies this clause (a second language sentence) unchanged to the outputting part 16 and processing skips the step S12 and proceeds to the step S13. In the step S13, the second language sentence supplied from the clause compounding part 15 is outputted, and processing ends.

Because, as described above, in the clause dividing part 4 and the simple syntax analyzing part 6 the first language sentence is divided in stages first into clauses, which are large syntax units, and then into phrases, which are small syntax units, and translation of the syntax units obtained at each stage, i.e. clauses and phrases, is carried out using examples, compared to a case wherein translation of the entire first language sentence is carried out in one stage, it is possible to increase the translation processing speed.

In the case described above, division of the first language sentence into clauses is carried out when there is among the clauses constituting the first language sentence a clause which matches a clause unit example stored in the clause pattern translation example memory 5 and on the basis of this clause; however, division into clauses can also be carried out irrespective of this kind of condition.

Next, the processing carried out by the translating apparatus of FIG. 5 when for example 'DEKIMASHITARA ICHIGO NO AISU KUREEMU O ONEGAI SHITAI 'N DESU GA' ('If possible, may I have some strawberry ice cream?') is inputted will be described with reference to FIGS. 8A through 10C.

By morpheme analysis being carried out in the inputting part 1, for example the kind of morpheme information shown in FIG. 8A is extracted from this first language sentence 'DEKIMASHITARA ICHIGO NO AISU KUREEMU O ONEGAI SHITAI 'N DESU GA'. In FIG. 8A, for reference, modality case information in the grammatical attributes of the first language sentence is also shown.

The first language sentence 'DEKIMASHITARA ICHIGO NO AISU KUREEMU O ONEGAI SHITAI 'N DESU GA' and its morpheme information are supplied from the inputting part 1 to the collating part 2. Now, assuming that 'DEKIMASHITARA ICHIGO NO AISU KUREEMU O ONEGAI SHITAI 'N DESU GA' is not stored as an example in the set phrase translation example memory 3, the first language sentence 'DEKIMASHITARA ICHIGO NO AISU KUREEMU O ONEGAI SHITAI 'N DESU GA' and its morpheme information are supplied from the collating part 2 to the clause dividing part 4.

In the clause dividing part 4, collation of the first language sentence 'DEKIMASHITARA ICHIGO NO AISU KUREEMU O ONEGAI SHITAI 'N DESU GA' with the clause unit examples stored in the clause pattern translation example memory 5 is carried out. Here, supposing now that for example translation example data of the kind shown in FIG. 8B made up of an example 'DEKIMASHITARA X' and its translation 'X, if possible' are stored in correspondence with each other in the clause pattern translation example memory 5, because in the first language sentence 'DEKIMASHITARA ICHIGO NO AISU KUREEMU O ONEGAI SHITAI 'N DESU GA' there is a clause matching the example 'DEKIMASHITARA' (in this case, 'ICHIGO NO AISU KUREEMU O ONEGAI SHITAI 'N DESU GA' is recognized as matching the X part), the first language sentence 'DEKIMASHITARA ICHIGO NO AISU KUREEMU O ONEGAI SHITAI 'N DESU GA' is divided up in the clause dividing part 4 into the clauses 'DEKIMASHITARA' and 'ICHIGO NO AISU KUREEMU O ONEGAI SHITAI 'N DESU GA'.

The translation 'X, if possible' corresponding to the clause 'DEKIMASHITARA' matching a clause unit example stored in the clause pattern translation example memory 5 is then supplied from the clause dividing part 4 to the clause compounding part 15. Also, the remaining clause of the first language sentence, 'ICHIGO NO AISU KUREEMU O ONEGAI SHITAI 'N DESU GA', is supplied from the clause dividing part 4 to the simple syntax analyzing part 6.

In the simple syntax analyzing part 6, by the syntax of the clause 'ICHIGO NO AISU KUREEMU O ONEGAI SHITAI 'N DESU GA' being analyzed, it is recognized that 'ICHIGO NO AISU KUREEM O' constitutes one noun phrase and 'ONEGAI SHITAI 'N DESU GA' constitutes one verb phrase. Also, in this case, it is recognized that the noun phrase 'AISU KUREEMU O' is the object of the verb phrase 'ONEGAI SHITAI 'N DESU GA'. On the basis of these recognition results, the clause 'ICHIGO NO AISU KUREEMU O ONEGAI SHITAI 'N DESU GA' is divided into phrase units.

Here, for example although the translation of the verb 'TORU' in the sentence 'OKANE O TORU' ('to take money') is 'take' or 'get', the translation of the verb 'TORU' in the sentence 'CHOUSHOKU O TORU' ('to have breakfast') is 'have' or 'eat'. Thus with a verb (or a verb phrase) it is sometimes difficult to determine its translation if the object, subject or complement is not known. For this reason, in the simple syntax analyzing part 6, in cases like this, when necessary an object, subject or complement or the like is included with the verb (predicative part) to make one verb phrase.

That is, in this case, the clause 'ICHIGO NO AISU KUREEMU O ONEGAI SHITAI 'N DESU GA' is divided into the noun phrase 'ICHIGO NO AISU KUREEMU O' and the verb phrase, including an object, of 'AISU KUREEMU O ONEGAI SHITAI 'N DESU GA'.

Also, in the simple syntax analyzing part 6, grammatical attributes of the phrases are generated (recognized) and assigned to the phrases.

That is, for the verb phrase 'ICHIGO NO AISU KUREEMU O', for example slot-name values to the effect that 'ICHIGO NO' is a modifier of 'AISU KUREEMU O' and 'AISU KUREEMU O' is modified by 'ICHIGO NO' are produced (however, because in this case these grammatical attributes are not used in subsequent processing they will not be referred to particularly in the following).

Also, for the verb phrase 'AISU KUREEMU O ONEGAI SHITAI 'N DESU GA', as shown in FIG. 9A, a slot-name value (root 'ONEGAI SURU'+desiderative) meaning that 'ONEGAI SHITAI 'N DESU GA' is a desiderative form of the root 'ONEGAI SURU' and a slot-name value (NP1 'AISU KUREEMU O') meaning that its object is ice cream (a food) are produced.

The noun phrase 'ICHIGO NO AISU KUREEMU O' and the verb phrase 'AISU KUREEMU O ONEGAI SHITAI 'N DESU GA' and their grammatical attributes thus obtained are supplied from the simple syntax analyzing part 6 to the converting part 7.

In the converting part 7, each of the phrases supplied from the simple syntax analyzing part 6 and the stored content of the noun phrase translation example memory 8, the verb phrase translation example memory 9 or the other translation example memory 10 are collated and the example phrases most similar to the phrases supplied from the simple syntax analyzing part 6 are detected (searched) from the noun phrase translation example memory 8, the verb phrase translation example memory 9 or the other translation example memory 10.

That is, when for instance in the verb phrase translation example memory 9 the example 'TANAKA SAN O ONEGAI SHITAI 'N DESU GA' ('Mr. Tanaka, please') is stored in association with the slot-name values (root 'ONEGAI SURU'+desiderative) and NP1 'TANAKA SAN O' and also in correspondence with the translation of this, 'may I speak to NP1?', as shown in FIG. 9B, and the example 'KOUHEE O IPPAI ONEGAI SHITAI 'N DESU GA' is stored in association with the slot-names (root 'ONEGAI SURU'+desiderative) and NP1 'KOUHEE O IPPAI' and also in correspondence with the translation of this, 'may I have NP1?', as shown in FIG. 9C, then from a comparison of the distance in meaning between the objects 'AISU KUREEMU O' and 'TANAKA SAN O' and the distance in meaning between the objects 'AISU KUREEMU O' and 'KOUHEE O IPPAI', the example 'KOUHEE O IPPAI ONEGAI SHITAI 'N DESU GA' is detected as the example most similar to the verb phrase 'AISU KUREEMU O ONEGAI SHITAI 'N DESU GA'.

The translation 'may I have NP1?' corresponding to this example 'KOUHEE O IPPAI ONEGAI SHITAI 'N DESU GA' is then read from the verb phrase translation example memory 9 and supplied from the converting part 7 to the phrase compounding part 14 as the translation of the verb phrase 'AISU KUREEMU O ONEGAI SHITAI 'N DESU GA'.

Also, in the converting part 7, supposing that for instance the example 'SAKUJITSU NO GYUUNYUU' and its translation 'yesterday's milk', the example 'WATASHI NO HON' and its translation 'my book' and the example 'KOUHEE NO AISU KUREEMU' and its translation 'coffee flavored ice cream' are respectively stored in correspondence with each other in the noun phrase translation example memory 8, as shown in FIG. 10A, 'KOUHEE NO AISU KUREEMU' is detected as the example most similar to the noun phrase 'ICHIGO NO AISU KUREEMU O' from the simple syntax analyzing part 6, and the translation 'coffee flavored ice cream' corresponding to this is read from the noun phrase translation example memory 8

In this case, in the converting part 7 it is recognized that in the noun phrase 'ICHIGO NO AISU KUREEMU O' the 'KOUHEE' in the example 'KOUHEE NO AISU KUREEMU' has become 'ICHIGO', and 'ICHIGO', which is not in the example, is found up by referring to the translation dictionary 13.

Here, it will be assumed that 'ICHIGO' and its translation 'strawberry' are stored in correspondence with each other in the translation dictionary 13 as shown in FIG. 10B.

When the converting part 7 finds 'ICHIGO' in the translation dictionary 13, it reads out the 'strawberry' stored in correspondence with it. Then, the translation 'coffee' of the 'KOUHEE', corresponding to 'ICHIGO', in the translation 'coffee flavored ice cream' read from the noun phrase translation example memory 8, is replaced with the 'strawberry' read from the translation dictionary 13, and the translation 'strawberry flavored ice cream' of the noun phrase 'ICHIGO NO AISU KUREEMU O' is thereby generated. This translation 'strawberry flavored ice cream' is supplied from the converting part 7 to the phrase compounding part 14.

In the phrase compounding part 14, the translation 'strawberry flavored ice cream' of the noun phrase 'ICHIGO NO AISU KUREEMU O' and the translation 'may I have NP1?' of the verb phrase 'AISU KUREEMU O ONEGAI SHITAI 'N DESU GA' are compounded and the translation 'may I have strawberry flavored ice cream?' of the clause 'ICHIGO NO AISU KUREEMU O ONEGAI SHITAI 'N DESU GA' is thereby generated, and this is supplied to the clause compounding part 15.

When the clause compounding part 15 receives the translation 'may I have strawberry flavored ice cream?' of the clause 'ICHIGO NO AISU KUREEMU O ONEGAI SHITAI 'N DESU GA' and the translation 'X, if possible' of the clause 'DEKIMASHITARA', it compounds them. In this way, the second language sentence 'may I have strawberry flavored ice cream, if possible?', consisting of the first language sentence 'DEKIMASHITARA ICHIGO NO AISU KUREEMU O ONEGAI SHITAI 'N DESU GA' translated into the second language, is generated.

Next, the method of detection of the example phrases most similar to the input phrases used in the converting part 7 will be described in detail. Now, the words constituting an input phrase I will be expressed, from the beginning of the phrase, as $iw_1, iw_2, \ldots, iw_N$, and their slot-name values will be expressed as $if_1, if_2, \ldots, if_Q$. Similarly, the words constituting an example phrase E will be expressed, from the beginning of the phrase, as $ew_1, ew_2, \ldots, ew_M$, and their slot-name values will be expressed as $ef_1, ef_2, \ldots, ef_P$. Here, M and N respectively are the numbers of words constituting the example phrase E and the input phrase I, and P and Q respectively are the numbers of grammatical attributes of (extracted from) the example phrase E and the input phrase I.

The example most similar (similar in meaning) to an input phrase is the one most suitable to be used in translation processing of that input phrase. Now, if the probability of a certain example phrase E being suitable for translation of an input phrase I is called its translation suitability, this translation suitability can be expressed as a conditional probability of the example phrase as P(Example|Input). Here, P() expresses probability and Example and Input respectively mean a set of example phrases and a set of input phrases.

The example phrase most similar to an input phrase is that for which this translation suitability P(Example|Input) is the highest, and when this is written $E_{max}$, this example phrase $E_{max}$ can be obtained from Exp. (2).

$$E_{max} = \max_{E \in Example}[P(E|I)] \tag{2}$$

The right side of Exp. (2) means an operation obtaining the E for which the value inside the [] is a maximum.

The translation suitability P(Example|Input) can be expressed according to Bayes law as shown in Exp. (3).

$$P(Example|Input) = P(Example)P(Input|Example)/P(Input) \tag{3}$$

Here, when finding the example phrase E ($E_{max}$) most similar to a certain input phrase I, because there is only one input phrase I, that is, Input=I, the denominator P(Input) of Exp. (3) is 1 and can be ignored. Therefore, from Exp. (2) and Exp. (3), it is possible to obtain the example phrase $E_{max}$ most similar to the input phrase I using the following Exp. (4).

$$E_{max} = \max_{E \in Example}[P(E)P(1E)] \tag{4}$$

From Exp. (4), to obtain the example phrase having the greatest translation suitability with respect to the input phrase, it is necessary to obtain the probabilities P(E) and P(I|E).

Here, the probability P(E) represents the priori probability of the example E (E∈Example) being used for translation. The probability (conditional probability) P(I|E) represents the probability (hereinafter for convenience referred to as the transformation probability) of the example phrase E being transformed into the input phrase I and used.

The priori probability P(E) must correspond to the suitability of the example phrase E being used in any input phrase, and therefore should for example reflect the following kinds of factor. That is, first it is necessary to reflect in the priori probability P(E) the factor of what kinds of expression are frequently used in the domain (the type of expression (writing) inputted into the translating apparatus (for example writing appearing in machine manuals, or newspaper articles)) in which the translating apparatus is to be applied.

Specifically, example phrases E corresponding to expressions frequently used in the domain must be given higher priori probabilities P(E) than example phrases E corresponding to expressions only rarely used and expressions having meaning content having little relation to the domain.

Next, it is necessary to reflect in the priori probability P(E) the factor of what other example phrases are stored in the translating apparatus besides that example phrase E (in the translating apparatus of FIG. 5, because the example phrases are divided into noun phrases, verb phrases and other phrases and respectively stored in the noun phrase translation example memory 8, the verb phrase translation example memory 9 and the other translation example memory 10, depending on whether the input phrase is a noun phrase, a verb phrase or an other phrase this becomes the factor of what kinds of example phrases are stored in the noun phrase translation example memory 8, the verb phrase translation example memory 9 or the other translation example memory 10). Specifically, for example it is necessary to give to extremely general example phrases E of which there are almost no other similar example phrases a higher priori probability P(E) than special example phrases and example phrases of which there are many similar example phrases.

A priori probability P(E) in which these kinds of factor are suitably reflected can for example be obtained using corpus data (training corpus data), which is a set of language expressions typically used in the domain in which the translating apparatus is to be applied.

That is, for example accurately selecting from among the example phrases stored in the translating apparatus those example phrases which are most suitable for translating corpus data is carried out manually or by other means for all the corpus data. In this case, if the number of example phrases stored in the translating apparatus is expressed $N_E$, the total number of times a selection is made from among these example phrases is expressed T and the number of times an example $E_i$ (i=1, 2, . . , $N_E$) is selected is expressed freq ($E_i$), it is possible to obtain the priori probability $P(E_i)$ for each example $E_i$ for instance from Exp. (5).

$$P(E_i) \approx \frac{freq(E_i)}{T} \quad (5)$$

Here, when selecting the example phrases most suitable for translation of corpus data manually is problematic, it is possible to obtain approximate values of the priori probability $P(E_i)$ in Exp. (5) by making the translating apparatus translate the corpus data.

Figure 11:
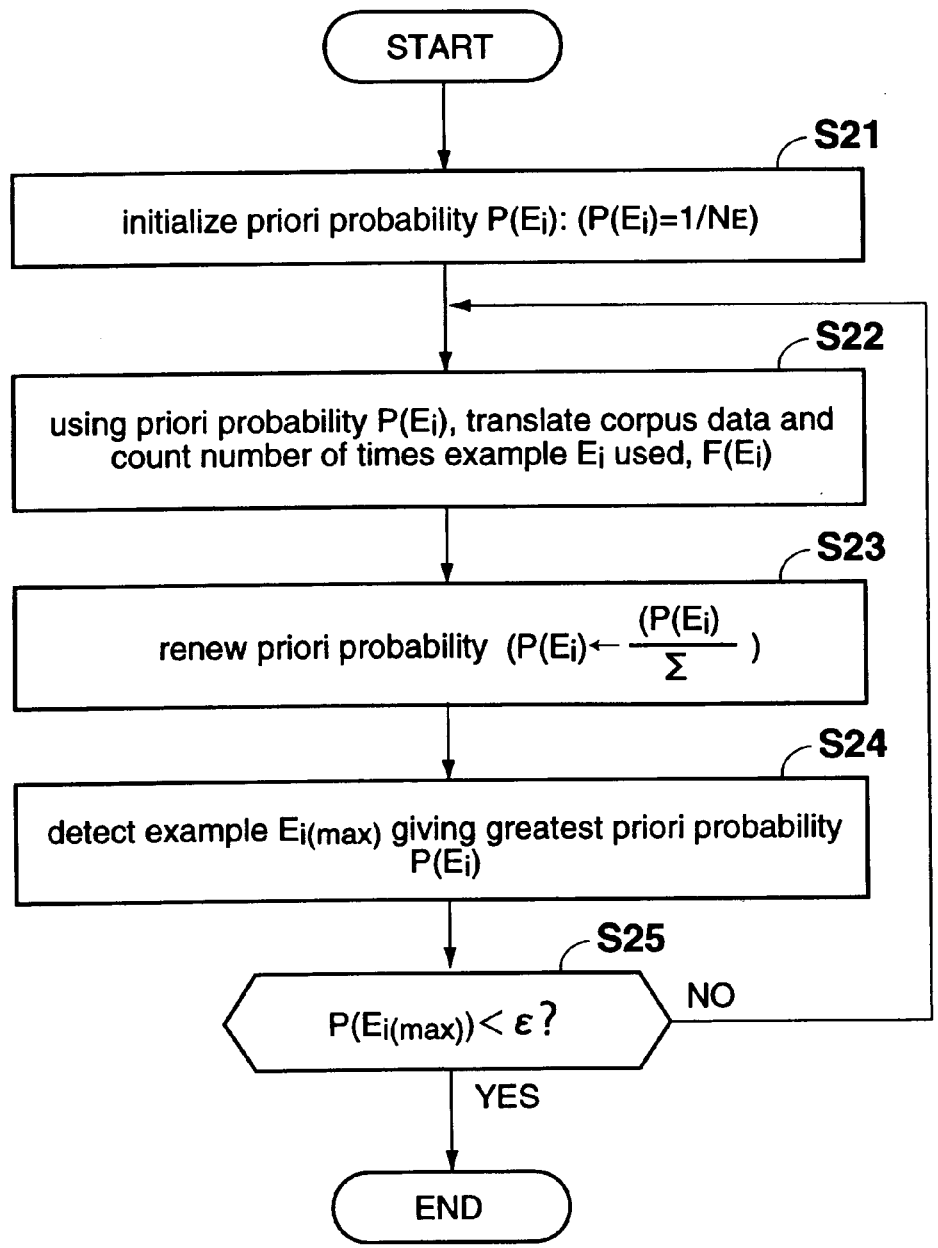
FIG. 11 is a flow chart illustrating a method for obtaining a priori probability $P(E_i)$.

That is, as shown in the flow chart of FIG. 11, first, in a step S21, the priori probabilities $P(E_i)$ are all initialized to for example $1/N_E$. Then, in a step S22, using this priori probability $P(E_i)$, the translating apparatus of FIG. 5 is made to translate all the corpus data, and at this time the number of times $F(E_i)$ that each example phrase ($E_i$) is used is counted. Then, in a step S23, the priori probabilities $P(E_i)$ are renewed for example according to the expression $P(E_i)=F(E_i)/\Sigma$, where $\Sigma$ is the summation of $F(E_i)$ over i=1 to $N_E$.

After the priori probability $P(E_i)$ has been renewed for all the example phrases $E_i$, processing proceeds to a step S24 and detects the example phrase $E_{i(max)}$ given the greatest priori probability. Processing then proceeds to a step S25 and determines whether or not the priori probability $P(E_{i(max)})$ of the example phrase $E_{i(max)}$ is smaller than a predetermined threshold value, and when it is not smaller returns to the step S22 and repeats the steps S22 through S25. When the priori probability ($E_{i(max)}$) is smaller than the predetermined threshold value, the priori probabilities ($E_i$) at that time are outputted as the priori probabilities for the example phrases $E_i$ and processing ends.

When obtaining corpus data is problematic, it is also possible for example to obtain priori probabilities $P(E_i)$ in the following way using the example phrases stored in the translating apparatus.

That is, if among the words constituting an example phrase $E_i$ for which a priori probability $P(E_i)$ is to be obtained the number of words that match words constituting another example phrase is expressed $W_N$ and among the slot-names of the example phrase ($E_i$) the number of slot-names had by another example is expressed $F_N$, the generality of that example phrase $E_i$, or its similarity sim-score ($E_i$) to other examples, can for example be estimated as $(W_N+F_N)/$(the number of words constituting the example phrase $E_i$). In this case, the priori probability $P(E_i)$ can for example be obtained according to Exp. (6).

$$P(E_i) \approx \frac{1}{\text{sim}-\text{score}(E_i)} \times \frac{1}{\sum_{j=1}^{N_E} \frac{1}{\text{sim}-\text{score}(E_j)}} \quad (6)$$

Next, the transformation probability $P(I|E)$ can be obtained in the following way. When a user expresses the meaning content of an example phrase E, it can be considered that with a certain high probability the user will use an expression with words and phrases the same as the example phrase E, with a slightly lower probability the user will use an expression only slightly different from the example phrase E and with a lower probability the user will use an expression greatly different from the example phrase E.

Therefore, the input phrase I can be regarded as a variation produced as a result of the expression of the example phrase E being distorted in the language production process of the user. In this connection, the following kinds of transforming operators for transforming (distorting) the example phrase E will be introduced.

That is, as operators operating on the words constituting the example phrase E, a word copying operator echo-word ($ew_m,iw_n$), a word deleting operator delete-word($ew_m$), a word inserting operator add-word($iw_n$) and a word replacing operator alter-word($ew_m,iw_n$) will be introduced. Also, as operators operating on the slot-name values of the example phrase E, a slot-name value copying operator echo-feature ($ef_p,if_q$), a slot-name value deleting operator delete-feature ($ef_p$), a slot-name value inserting operator add-feature($if_q$) and a slot-name value replacing operator alter-feature($ef_p, if_q$) will be introduced.

Here, the word copying operator echo-word($ew_m,iw_n$) is an operator which without changing it makes the mth (mth from the beginning) word $ew_m$ of the example phrase E the nth word $iw_n$ of the input phrase I. The word deleting operator delete-word($ew_m$) is an operator which deletes the mth word $ew_m$ of the example phrase E. The word inserting operator is an operator which inserts (adds) the nth word $iw_n$ of the input phrase I to the example phrase E. The word replacing operator alter-word($ew_m,iw_n$) is an operator which replaces the mth word $ew_m$ of the example phrase E with the nth word $iw_n$ of the input phrase I (here, the word $iw_n$ is close in meaning to but different from the word $ew_m$).

The slot-name value copying operator echo-feature($ef_p, if_q$) is an operator which without changing it makes the pth slot-name value of the example phrase E (in the case of slot-name values, their position in the phrase does not particularly affect processing and therefore here the order of the slot-name values is a matter of convenience) the qth slot-name value $if_q$ of the input phrase I. The slot-name value deleting operator delete-feature($ef_p$) is an operator which deletes the pth slot-name value $ef_p$ of the example phrase E. The slot-name value inserting operator add-feature ($if_q$) is an operator which inserts the qth slot-name value $if_q$ of the input phrase I into the example phrase E. The slot-name value replacing operator alter-feature($ef_p,if_q$) is an operator which replaces the pth slot-name value of the example phrase E with the qth slot-name value $if_q$ of the input phrase I (here, the slot-name value $if_q$ is close in meaning to but different from the slot-name value $ef_p$).

Now, if the aforementioned transforming operators as a whole are expressed $distort_z$ and that which is obtained by Z transforming operators $distort_1, distort_2, \ldots, distort_z$ being applied to the example phrase E is the input phrase I, the input phrase I can be defined as the set of these transforming operators, as shown in Exp. (7).

$$I=(distort1,distort2, \ldots, distortz) \quad (7)$$

There may be more than one way of transforming the example phrase E into the input phrase I, but here it is sufficient to consider just a transformation following a most probable direct route.

From Exp. (7), the transformation probability $P(I|E)$ can be expressed as shown in Exp. (8).

$$P(I|E=p((distort1,distort2, \ldots ,distort_k)/E) \quad (9)$$

Here, as shown in Exp. (9), the transforming operators can each be regarded as independent.

$$P(\text{distort}_k|\text{distort}_1,\text{distort}_2,\ldots \text{distort}_z;E)=P(\text{distort}_k|E) \quad (9)$$

Therefore, from Exp. (9), Exp. (8) can be simplified as shown in Exp. (10) and as a result the transformation probability P(I|E) becomes as shown in Exp. (11).

$$P(\{\text{distort}_1, \text{distort}_2, \ldots, \text{distort}_Z\} \mid E) \approx \prod_{Z=1}^{Z} \cdot P(\text{distort}_z \mid E) \quad (10)$$

$$P(I \mid E) \approx \prod_{z=1}^{Z} P(\text{distort}_z \mid E) \quad (11)$$

Also, because the example phrase E can be expressed as the set of the words $ew_m$ (m=1, 2, ..., M) and the slot-name values $ef_p$ (p=1, 2, ..., P), Exp. (11) becomes as shown in Exp. (12).

$$P(I \mid E) \approx \prod_{z=1}^{Z} P(\text{distort}_z \mid ew_1, ew_2, \ldots, ew_M; ef_1, ef_2, \ldots, ef_P) \quad (12)$$

From Exp. (12), if the probability $P(\text{distort}_k|ew_1,ew_2,\ldots, ew_M; ef_1, ef_2, \ldots, ef_P)$ is known for the cases wherein the transforming operator $\text{distort}_k$ is respectively the word copying operator echo-word($ew_m,iw_n$), the word deleting operator delete-word($ew_m$), the word inserting operator add-word ($iw_n$), the word replacing operator alter-word($ew_m,iw_n$), the slot-name value copying operator echo-feature($ef_p,if_q$), the slot-name value deleting operator delete-feature($ef_p$), the slot-name value inserting operator add-feature($if_q$) or the slot-name value replacing operator alter-feature($ef_p,if_q$), the transformation probability P(I|E) can be obtained.

Here, the following assumptions can be made about the transforming operators, and as a result it is possible to simplify the probability $P(\text{distort}_k| ew_1,ew_2, \ldots, ew_M; ef_1,ef_2, \ldots ,ef_P)$ for each of the transforming operators.

That is, in the case of the word copying operator echo-word($ew_m,iw_n$), the probability of the mth word $ew_m$ of the example phrase E being made the nth word $iw_n$ of the input phrase I without being changed can be assumed to depend only on these words $ew_m$, $iw_n$. Therefore, the probability P(echo-word($ew_m,iw_n$) $ew_1,ew_2, \ldots,ew_M; ef_1,ef_2,\ldots ,ef_P$) can be simplified as shown in Exp. (13).

$$P(\text{echo-word}(ew_m,iw_n)|ew_1,ew_2,\ldots, ew_M;ef_1,ef_2,\ldots, ef_P) \approx P(\text{echo-word}(ew_m,iw_n)) \quad (13)$$

Because the probability shown in Exp. (13) is the probability of the word $ew_m$ being as it were copied as a word of the input phrase I without being changed, hereinafter it will for convenience be referred to as the word copy probability.

In the case of the word deleting operator delete-word ($ew_m$), it can be assumed that the probability of the mth word $ew_m$ of the example phrase E being deleted depends only on that word $ew_m$. Therefore, the probability P(delete-word ($ew_m$)|$ew_1,ew_2, \ldots ,ew_M; ef_1,ef_2, \ldots ef_P$) can be simplified as shown in Exp. (14).

$$P(\text{delete-word}(ew_m)|ew_1,ew_2,\ldots,ew_M;ef_1,ef_2,\ldots,ef_P) \approx P(\text{delete-word}(ew_m)) \quad (14)$$

Because the probability shown in Exp. (14) is the probability of the word $ew_m$ being deleted, hereinafter it will for convenience be referred to as the word deletion probability.

In the case of the word inserting operator add-word($iw_n$), it can be assumed that the probability of the nth word $iw_n$ of the input phrase I being inserted into the example phrase E depends only on that word $iw_m$. Therefore, the probability P(add-word($iw_n$)| $ew_1,ew_2, ew_M; ef_1,ef_2, \ldots ,ef_P$) can be simplified as shown in Exp. (15).

$$P(\text{add-word}(nw_n)|ew_1,ew_2,.1.ew_M, ef_1,ef_2,\ldots ef_P)) \approx P(\text{add-word}(W_n)) \quad (15)$$

Because the probability shown in Exp. (15) is the probability of the word $iw_n$ being inserted (added), hereinafter it will for convenience be referred to as the word insertion probability (or the word addition probability).

In the case of the word replacing operator alter-word($ew_m, iw_n$), it can be assumed that the probability of the mth word $ew_m$ of the example phrase E being replaced with the nth word $iw_m$ of the input phrase I depends only on those words $ew_n$ and $iw_n$. Therefore, the probability P(alter-word($ew_m, iw_n$)|$ew_1,ew_2, \ldots , ew_M; ef_1,ef_2,ef_P$) can be simplified as shown in Exp. (16).

$$P(\text{alter-word}(ew_m,w_n)|ew_1,ew_2,\ldots,ew_M; ef_1, ef_2, \ldots ef_P)) = P(\text{after-word}(ew_m,;iw_n)) \quad (16)$$

Because the probability shown in Exp. (16) is the probability of the word $ew_m$ being replaced with the word $iw_n$, hereinafter it will for convenience be referred to as the word replacement probability.

Also in the cases of the slot-name value copying operator echo-feature($ef_p,if_q$), the slot-name value deleting operator delete-feature($ef_p$), the slot-name value inserting operator add-feature($if_q$) and the slot-name value replacing operator alter-feature($ef_p,if_q$) expressing copying, deleting, inserting and replacing of slot-name values, the same assumptions can be made as when the words in the word copying operator echo-word($ew_m,iw_n$), the word deleting operator delete-word($ew_m$), the word inserting operator add-word($iw_n$) and the word replacing operator alter-word($ew_m,iw_n$) expressing copying, deleting, inserting and replacing of words are replaced with slot-name values.

As a result, the probability of the slot-name value $ef_p$ being copied (hereinafter for convenience referred to as the slot-name value copy probability) P(echo-feature($ef_p,if_q$) $ew_1,ew_2, \ldots,ew_M; ef_1,ef_2, \ldots ,ef_P$), the probability of the slot-name value $ef_p$ being deleted (hereinafter for convenience referred to as the slot-name value deletion probability) P(delete-feature($ef_p$)| $ew_1,ew_2, \ldots ew_M; ef_1,ef_2, \ldots ,ef_P$), the probability of the slot-name value $if_q$ being inserted (hereinafter for convenience referred to as the slot-name value insertion probability) P(add-feature($if_q$) |$ew_1,ew_2 \ldots ,ew_M; ef_1,ef_2, \ldots ,ef_P$) and the probability of the slot-name value $ef_p$ being replaced with the slot-name value $if_q$ (hereinafter for convenience referred to as the slot-name value replacement probability) P(alter-feature ($ef_p,if_q$)|$ew_1,ew_2, \ldots , ew_M; ef_1,ef_2, \ldots , ef_P$) can respectively be simplified as shown in Exps. (17) through (20).

$$P(\text{echo-feature}(ef_p,if_q)|ew_1,ew_2,\ldots, ew_M,ef_1,ef_2,\ldots, ef_P)) \approx P(\text{echo-feature}(ef_p,if_q)) \quad (17)$$

$$P(\text{delete-feature}(ef_p)|ew_1, ew_2,\ldots, ew_M,ef_1, ef_2,\ldots, ef_P)=P(\text{delete-feature}(ef_p)) \quad (18)$$

$$P(\text{add-feature}(if_q)|ew_1,ew_2,\ldots, ew_M,ef_1, ef_2,\ldots, ef_P))=P(\text{add-feature}(if_q)) \quad (19)$$

$$P(\text{alter-feature}(ef_p,if_q)|ew_1,ew_2,\ldots, ew_M; ef_1,ef_2,\ldots, ef_P))=P(\text{alter-feature}(ef_p,if_q)) \quad (20)$$

From the above, if the word copying operator echo-word ($ew_m,iw_n$), the word deleting operator delete-word($ew_m$), the word inserting operator add-word($iw_n$) and the word replacing operator alter-word($ew_m, iw_n$), which are transforming operators for words (and hereinafter for convenience referred to as word transforming operators), are expressed as a whole as distort-word$_x$($ew_m, iw_n$) and the slot-name value copying operator echo-feature($ef_p, if_q$), the slot-name value deleting operator delete-feature($ef_p$), the slot-name value inserting operator add-feature($if_q$) and the slot-name value replacing operator alter-feature($ef_p, if_q$), which are transforming operators for slot-name values (and hereinafter for convenience referred to as slot-name value transforming operators) are expressed as a whole as distort-feature$_y$ ($ef_p$, $if_q$), the transformation probability P(I|E) expressed in Exp. (11) can be expressed with the product of the transformation probabilities (hereinafter for convenience referred to as the word transformation probability) P(distort-word$_x$($ew_m, iw_n$)) of the word transforming operator distort-word$_x$($ew_m, iw_n$), and the product of the transformation probabilities (hereinafter for convenience referred to as the slot-name value transformation probabilities) P(distort-feature$_y$($ef_p$, $if_q$)) of the slot-name value transforming operator distort-feature$_y$($ef_p, if_q$).

$$P(I \mid E) \approx \prod_{x=1}^{X} P(\text{distort} - \text{word}_x(ew_m, iw_n)) \prod_{y=1}^{Y} P(\text{distort} - \text{feature}_q(ef_p, if_q)) \quad (21)$$

Here, X and Y respectively are the total numbers of word transforming operators and slot-name value transforming operators applied, and X+Y=Z (Exp. 11)).

Next, the methods by which the word copy probability P(echo-word($ew_m, iw_n$)), the word deletion probability P(delete-word($ew_m$)), the word insertion probability P(add-word($iw_n$)), the word replacement probability P(alter-word ($ew_m, iw_n$)), and the slot-name value copy probability P(echo-feature($ef_p, if_q$)), the slot-name value deletion probability P(delete-feature($ef_p$)), the slot-name value insertion probability P(add-feature($if_q$)) and the slot-name value replacement probability P(alter-feature($ef_p, if_q$)) are calculated will be described.

First, the word copy probability P(echo-word($ew_m, iw_n$)), the word deletion probability P(delete-word($ew_m$)) and the word insertion probability P(add-word($iw_n$)) can be regarded as reflecting human language production behavior. That is, some types of word have a greater or lesser probability of being copied, deleted or inserted than other words. Therefore, when corpus data of the domain in which the translating apparatus is to be applied is available, it is possible to compute distributions of the probability of words being copied, deleted or replaced from corpus data and thereby obtain the word copy probability P(echo-word($ew_m$, $iw_n$)), the word deletion probability P(delete-word($ew_m$)) and the word insertion probability P(add-word($iw_n$)).

When on the other hand corpus data is difficult to obtain, on the basis of tendencies of words in language production (trends in the treatment of words (for example trends such as words tending to be used unchanged or tending to be deleted or inserted)), it is possible to classify words into a number of groups and give a word copying probability P(echo-word ($ew_m, iw_n$)), a word deletion probability P(delete-word ($ew_m$)) and a word insertion probability P(add-word($iw_n$)) to each of these groups.

In this preferred embodiment, words are classified into the four groups of strong independent words (for example verbs and nouns and so on); light independent words (for example adjectives and some adverbs (for example 'MATA' ('again')

and the like); functional words (for example particles and conjunctions); and modifiers (for example adverbs expressing level (for example 'TOTEMO' ('very') (also including adjuncts), and constants of the kind shown in Exps. (22) through (24) are given as the word copy probability P(echo-word($ew_m, iw_n$)), the word deletion probability P(delete-word($ew_m$)) and the word insertion probability P(add-word ($iw_n$)) respectively depending on which group the word to which the word transforming operator is to be applied belongs to.

$P$(echo-word($ew_m, iw_n$))≈echo-strong-content–when $ew_m$ is a strong independent word echo-light-content–when $ew_m$ is a light independent word echo-grammatical-function–when $ew_m$ is a functional word echo-modifier–when $ew_m$ is a modifier or an adjunct (22)

Here, echo-strong-content, echo-light-content, echo-grammatical-function and echo-modifier are predetermined constants between 0 and 1. The word copy probability P(echo-word($ew_m, iw_n$)) is given by Exp. (22) when the words $ew_m$ and $iw_m$ are the same; when they are not the same, it is made 0 (this is also the same in the case of the slot-name value copy probability, which corresponds to the word copy probability).

$P$(delete-word($ew_m$))≈delete-strong-content–when $ew_m$ is a strong independent word delete-light-content–when $ew_m$ is a light independent word delete-grammatical-function–when $ew_m$ is a functional word delete-modifier–when $ew_m$ is a modifier or an adjunct (23)

Here, delete-strong-content, delete-light-content, delete-grammatical-function and delete-modifier are predetermined constants between 0 and 1.

$P$(add-word($iw_n$))≈add-strong-content–when $iw_n$ is a strong independent word add-light-content–when $iw_n$ is a light independent word add-grammatical-function–when $iw_n$ is a functional word add-modifier–when $iw_n$ is a modifier or an adjunct (24)

Here, add-strong-content, add-light-content, add-grammatical-function and add-modifier are predetermined constants between 0 and 1.

In this preferred embodiment, in the same way, the slot-name value transformation probabilities, namely the slot-name value copy probability P(echo-feature($ef_p, if_q$)), the slot-name value deletion probability P(delete-feature ($ef_q$)), the slot-name value insertion probability P(add-feature($if_q$)) and the slot-name value replacement probability P(alter-feature($ef_p, if_q$)), are also given as constants.

Next, concerning the word replacement probability P(alter-word($ew_m, iw_n$)), this can be computed on the basis of the closeness in meaning between the words $ew_m$ and $iw_n$. That is, if the word $iw_n$ and the word $ew_m$ are synonyms a high probability can be given as the word replacement probability P(alter-word($ew_m, iw_n$)), if the word $iw_n$ and the word $ew_m$ are similar in meaning a slightly lower probability, and when the word $iw_n$ and the word $ew_m$ are unrelated then a lower probability can be given to the word replacement probability P(alter-word($ew_m, iw_n$)).

This kind of probability distribution relating to the words $ew_m$ and $iw_n$ can be obtained using corpus data. That is, using context similarity, when two words are used in similar contexts in the corpus data, the similarity between these two words can be regarded as being high, and when they are used in different contexts the similarity between two words can be regarded as being low. The two words having a high similarity can be given a high word replacement probability.

When on the other hand corpus data is difficult to obtain, it is possible to compute word replacement probabilities for example using a thesaurus of the kind shown in FIG. 6.

Here, in the thesaurus, distances in meaning between two words are reflected as the amount of information included by the concept (parent node) common to the two words. That is, when the common concept is an extremely general one like for example 'thing', it is not possible to obtain from that concept information relating to a specific word that it includes, but when the common concept is a considerably limited concept like for example 'vehicle with engine', it is possible to obtain from the concept much information relating to specific words that it includes. In other words, the amount of information included by a given concept (a node in the thesaurus) is inversely proportional to the number of words included in that concept (the number-dominated).

Therefore, the word replacement probability P(alter-word $(ew_m, iw_n)$) can be obtained from the amount of information included in the concept common to both the word $ew_m$ and the word $iw_n$, that is, on the basis of the number of words included in that concept in the thesaurus, for example according to Exp. (25).

$$P(\text{alter} - \text{word}(ew_m, ew_n)) \approx \frac{1}{K \times \text{number} - \text{dominated}(C(ew_m, iw_n))} \quad (25)$$

In the above expression, K is defined as follows:

$$K = \sum_{ew_m \in Vocab} \sum_{iw_n \in Vocab} \frac{1}{\text{number} - \text{dominated}(C(ew_m, iw_n))} \quad (26)$$

Here, $C(ew_m, iw_n)$ is a concept common to the words $ew_m$ and $iw_n$, and number-dominated($C(ew_m, iw_n)$) is the number of words included in the concept $C(ew_m, iw_n)$ (words having the concept $C(ew_m, iw_n)$ as a higher concept). Vocab means the set of words in the thesaurus. Therefore, the first and second Σ on the right side of Exp. (26) are respectively the summations of the words $ew_m$ and $iw_n$ successively substituted for the words in the thesaurus.

If a method like this wherein the distance between two words $ew_m$ and $iw_n$ is obtained on the basis of the amount of information included in a concept common to them is used, it is possible to accurately obtain the distance (relative distance) between the words irrespective of the structure of the thesaurus. That is, the thesaurus does not have to be constructed regularly, as it has been in the related art, and also the distances between concepts do not have to be the same. Also, the method can be applied both to thesauruses wherein words are classified minutely and to thesauruses wherein words are classified roughly. It can also be applied to thesauruses wherein classification has been carried out minutely or roughly only in a part of the thesaurus. Furthermore, the thesaurus may be one dedicated to a certain specific domain or may be a general one.

The transformation probability P(I|E), as was shown above in Exp. (21), can be obtained as the product of the word transformation probabilities P(distort-word$_x$($ew_m$, $iw_n$)) and the product of the slot-name value transformation probabilities P(distort-word$_y$($ef_p$,$if_q$)). Of the product of the word transformation probabilities P(distort-word$_x$($ew_m$, $iw_n$)) and the product of the slot-name value transformation probabilities P(distort-word$_y$($ef_p$,$if_q$)), the product of the slot-name value transformation probabilities P(distort-word$_y$ ($ef_p$,$if_q$)) can be obtained relatively simply as the product of the slot-name value copy probabilities P(echo-feature($ef_p$, $if_q$)), the slot-name value deletion probabilities P(delete-feature($ef_p$)), the slot-name value insertion probabilities P(add-feature($if_q$)) and the slot-name value replacement probabilities P(alter-feature($ef_p$,$if_q$)).

That is, concerning grammatical attributes, the grammatical attributes of the input phrase (hereinafter for convenience referred to as the input attributes) and the grammatical attributes of the example phrase (hereinafter for convenience referred to as the example attributes) are compared, and example attributes the same as input attributes, example attributes not among the input attributes, input attributes not among the example attributes, and example attributes which can be replaced with input attributes are detected. When there is an example attribute the same as an input attribute, an example attribute not among the input attributes, an input attribute not among the example attributes, or an example attribute which can be replaced with an input attribute, the slot-name value copy probability P(echo-feature($ef_p$,$if_q$)), the slot-name value deletion probability P(delete-feature($ef_p$)), the slot-name value insertion probability P(add-feature($if_q$)) or the slot-name value replacement probability P(alter-feature($ef_p$,$if_q$)) can be obtained (however, in this preferred embodiment, because as mentioned above these are all given as constants, it is not necessary to compute them), and by calculating their product it is possible to obtain the product of the slot-name value transformation probabilities P(distort-word$_y$($ef_p$,$if_q$)).

Specifically, when for example the input phrase is 'YOYAKU O SHITAI NO DESU GA' and its slot-name values are (desiderative +) (extended-predicate +) (s-part GA) (formal +) and the example phrase is 'YOYAKU O SHITE ITADAKITAI NO DESU GA' and its slot-name values are (gerund-suffix ITADAKU) (desiderative +) (extended-predicate +) (s-part GA) (formal +), the slot-name values (desiderative +), (extended-predicate +), (s-part GA) and (formal +) are detected as example attributes the same as input attributes and the slot-name value (gerund-suffix ITADAKU) is detected as an example attribute not among the input phrase attributes.

In this case, by calculating the product of the slot-name value copy probabilities P(echo-feature($ef_p$,$if_q$)) of the slot-name values (desiderative +), (extended-predicate +), (s-part GA) and (formal +) and the slot-name value deletion probability P(delete-feature($ef_p$)) of the slot-name value (gerund-suffix ITADAKU) it is possible to obtain the product of the slot-name value transformation probabilities P(distort-word$_y$ ($ef_p$,$if_q$)).

In obtaining the product of the word transformation probabilities P(distort-word$_x$($ew_m$,$iw_n$)), on the other hand, it is necessary to find the as it were most direct transformation route from the example phrase E to the input phrase I from among a number of transformation routes.

That is, when for example 'KOKO NI 3JI NI DENWA SURU' as an example phrase E has been assigned the translation 'call here at 3 o'clock', and this example phrase E is used in translation of the input phrase 'RESUTORAN NI DENWA SURU', for example the following two transformation routes (transformation methods) are conceivable.

Firstly, if with respect to the example phrase 'KOKO NI 3JI NI DENWA SURU', from the first word, 'KOKO' is deleted, 'NI' is deleted, '3JI' is replaced with 'RESUTORAN', 'NI' is copied, 'DENWA' is copied, 'O' is inserted and 'SURU' is copied, the input phrase 'RESUTORAN NI DENWA SURU' is obtained. Therefore, in this case, in the translation 'call here at 3 o'clock', 'here' corresponding to 'KOKO NI' is deleted, '3 o'clock' corresponding to '3JI' and 'the restaurant' corresponding to 'RESUTORAN' are replaced, and the translation 'call at the restaurant' is obtained.

Secondly, if with respect to the example phrase 'KOKO NI 3JI NI DENWA SURU', from the first word, 'KOKO' is replaced with 'RESUTORAN', 'NI' is copied, '3JI' is deleted, 'NI' is deleted, 'DENWA' is copied, 'O' is inserted and 'SURU' is copied, then again the input phrase 'RESU-TORAN NI DENWA SURU' is obtained. In this case, in the translation 'call here at 3 o'clock', 'here' corresponding to 'KOKO NI' is replaced with 'the restaurant' corresponding to 'RESUTORAN NI' and 'at 3 o'clock' corresponding to '3JI NI' is deleted, and the translation 'call the restaurant' is obtained.

In this case, the translation 'call the restaurant', obtained with the second transformation route, is correct, and therefore, in obtaining the word transformation probability P(distort-word$_x$(ew$_m$,iw$_n$)), it is necessary to find the as it were most direct transformation route (hereinafter for convenience referred to as the optimum route) like this second transformation route.

To do this, even when the lengths of the example phrase E and the input phrase I are different, i.e. even when the example phrase E and the input phrase I consist of different numbers of words, it is necessary to recognize corresponding words and find the best correspondence relationship (alignment) between the example phrase E and the input phrase I and then find the set of most probably-correct transforming operators (word transforming operators) that should be applied to transformation of the example phrase E into the input phrase I.

Now, if the set of word transforming operators is written Distort (={distort-word$_1$(ew$_m$,iw$_n$), distort-word$_2$(ew$_m$,iw$_n$), . . . , distort-word$_x$(ew$_m$,iw$_n$)}), the set Distort$_{max}$ of most probably-correct word transforming operators (hereinafter for convenience referred to as the optimum word transforming operators) to be applied to transformation of the example phrase E into the input phrase I can be obtained using Exp. (27).

$$\text{Distort}_{max} = \max_{Distort}[P(\text{Distort}|E, I)] \quad (27)$$

The right side of Exp. (27) means an operation for obtaining the Distort for which the value inside the [ ] is the maximum.

Here, the set of optimum word transforming operators is obtained for example using DP (Dynamic Programming). That is, first, to obtain from the probability P(Distort|E,I) the distance in DP, its negative log of −log(P(Distort|E,I)) is considered. Now, writing D=−log(P(Distort|E,I)), by assuming that the operators constituting the word transforming operator set Distort are independent, D can be simplified as shown in Exp. (28).

$$D = -\log \prod_{x=1}^{X} P(\text{distort} - \text{word}_x(ew_m, iw_n) \mid E, I) \quad (28)$$

If it is assumed that the word transforming operators are independent from those words, among the words of the input phrase I, which they do not affect directly, Exp. (28) can be further simplified as shown in Exp. (29).

$$D = -\log \prod_{X=1}^{X} P(\text{distort} - \text{word}_x(ew_m, iw_n) \mid ew_m, iw_n) \quad (29)$$

Dividing Exp. (29) for the individual transforming operators yields Exp. (30).

$$D = \sum_{X=1}^{X} -\log P(\text{distort} - \text{word}_x(ew_m, iw_n)) \quad (30)$$

The −log(P(distort-word$_x$(ew$_m$,iw$_n$))) on the right hand side of Exp. (30) is the distance between the words ew$_m$ and iw$_n$ when the mth word ew$_m$ of he example phrase and the nth word iw$_n$ of the input phrase are made to correspond, and this can be seen as directly corresponding to individual penalties (weight on the path) (cost) used in dynamic programming equations. Therefore, if distort-word$_x$(ew$_m$, iw$_n$) is rewritten as the word copying operator echo-word (ew$_m$,iw$_n$), the word deleting operator delete-word(ew$_m$), the word inserting operator add-word(iw$_n$) and the word replacing operator alter-word(ew$_m$,iw$_n$) and the sum of the distances (the cumulative distance) of when as far as the mth word ew$_m$ of the example phrase and the nth word iw$_n$ of the input phrase are made to correspond is expressed G(m,n), this cumulative distance G(m,n) can be obtained regressively according to the gradualized expression shown in Exp. (31).

$$G(m, n) = \min \begin{cases} G(m-1, n-1) & -\log P(\text{echo} - \text{word}(ew_m, iw_n)) \\ G(m, n-1) & -\log P(\text{add} - \text{word}(iw_n)) \\ G(m-1, n) & -\log P(\text{delete} - \text{word}(ew_m)) \\ G(m-1, n-1) & -\log P(\text{alter} - \text{word}(ew_m, iw_n)) \end{cases} \quad (31)$$

For the initial values, suitable values are assigned.

By calculating Exp. (31) for until for example m=M, it is possible to obtain the distance (the shortest distance) between the input phrase I and the example phrase E, and the path (DP path) obtained at that time shows the best (optimum) alignment between the input phrase I and the example phrase E, i.e. the optimum path. The set of word transforming operators which transform the example phrase E to match the input phrase I according to this optimum path (alignment) are the optimum word transforming operators.

By adopting the approach described above, it is possible to obtain the set of optimum word transforming operators even when the lengths of the example phrase E and the input phrase I are different.

Because the probability P(Distort|E,I) is the probability of a set of word transforming operators Distort being used to collate an input phrase I with an example phrase E and eliminate the differences in expression between the two, the probability model based on this probability can be called a stochastic expression collating model, and because the distance between the input phrase I and the example phrase E is obtained on the basis of this stochastic expression collating model it can be called a stochastic-expression-collating-model-based distance.

After the set of optimum word transforming operators is obtained in the way described above it is possible to obtain the product of the word transformation probabilities P(distort-word$_x$(ew$_m$,iw$_n$)), and it is then possible to obtain the transformation probability P(I|E) from this and the product of the slot-name value transformation probabilities P(distort-word$_y$(ef$_p$,if$_q$)) according to Exp. (21). By calculating the product of this transformation probability P(I|E) and the priori probability P(E) it is possible to obtain the translation suitability (P(I|E)P(E)), and the example phrase E of which this translation suitability is the greatest is the example phrase most similar to the input phrase I.

In the converting part 7, the example phrase E most similar to the input phrase I is detected in the way described above. That is, using a priori probability model and a transformation probability model respectively based on the priori probability P(E) and the transformation probability P(I|E), the example phrase E most similar to the input phrase I is detected. In this case, by using the transformation probability model, without excessively adding example phrases having superficial variations and omissions of particles and nouns and hesitations and so on in so-called spoken language to example phrases already prepared, it is possible to detect the example phrase most suitable for translating an input phrase, and as a result it is possible to increase the quality of translations.

Figure 12:
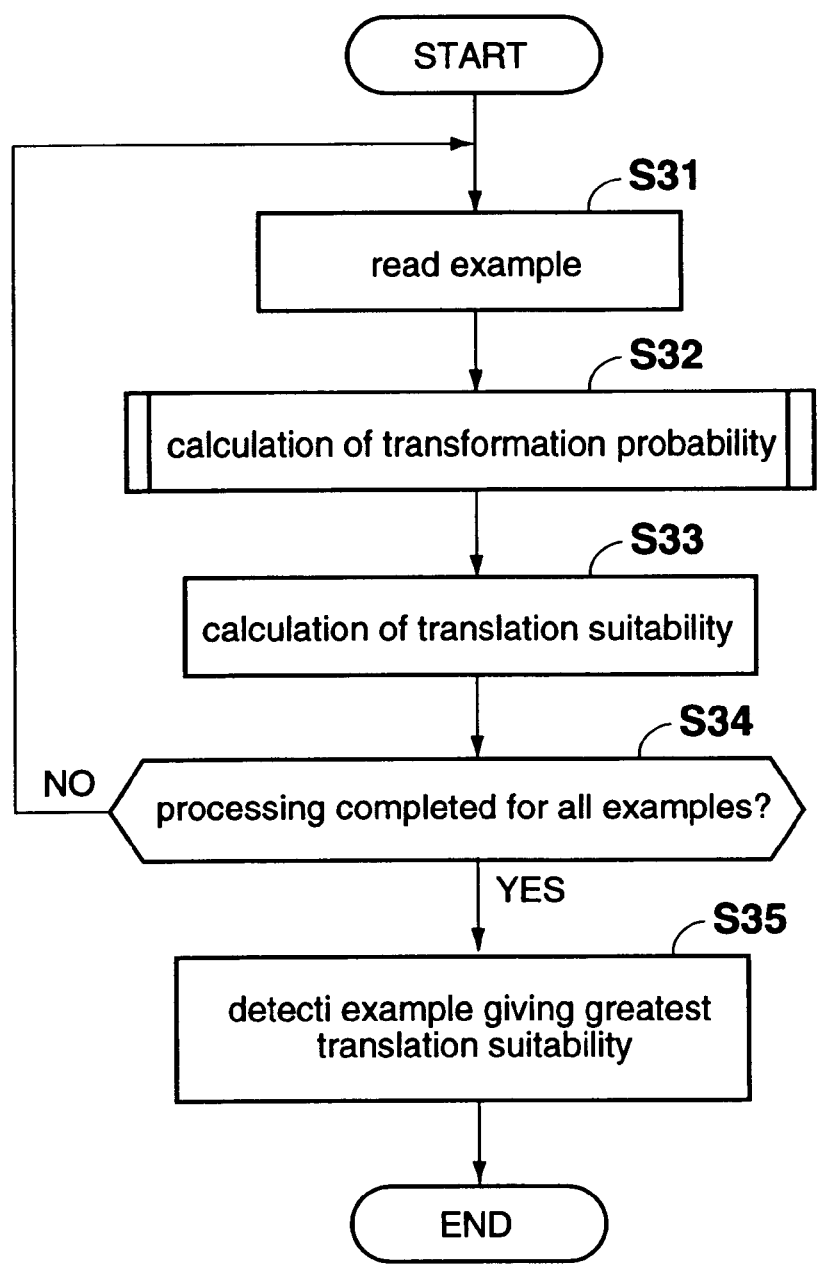
FIG. 12 is a flow chart illustrating processing carried out by a converting part 7 shown in FIG. 5.

Next, with reference to the flow chart of FIG. 12, the processing in the converting part 7 by which the example phrase E most similar to the input phrase I is detected will be described further. It will be assumed that priori probabilities P(E) have been assigned to the example phrases E and are stored in the noun phrase translation example memory 8, the verb phrase translation example memory 9 and the other translation example memory 10. It will be assumed also that the word copy probability P(echo-word $(ew_m, iw_n)$), the word deletion probability P(delete-word $(ew_m)$) and the word insertion probability P(add-word$(iw_n)$), and the slot-name value copy probability P(echo-feature($ef_p$, $if_q$)), the slot-name value deletion probability P(delete-feature($ef_p$)), the slot-name value insertion probability P(add-feature($if_q$)) and the slot-name value replacement probability P(alter-feature($ef_p, if_q$)) are given as constants and stored in a memory inside the converting part 7. Also, here, as an input phrase, it will be assumed that for example a noun phrase has been inputted into the converting part 7 and that therefore processing will be carried out using only the example phrases stored in the noun phrase translation example memory 8. However, if a verb phrase or an other phrase is inputted into the converting part 7 as the input phrase, the only difference is that the example phrases used in the processing become those stored in either the verb phrase translation example memory 9 or the other translation example memory 10, and the processing method is the same as in the case of a noun phrase described in the following.

When the converting part 7 receives an input phrase I (here, as mentioned above, a noun phrase), first, in a step S31, it reads an example phrase (a noun phrase) from the noun phrase translation example memory 8 (hereinafter, this read-out example phrase E will be called the focus example phrase). Also, in a step S32, the converting part 7 calculates the transformation probability P(I|E) of the focus example phrase E with respect to the input phrase I, and then proceeds to a step S33. In the step S33, in the converting part 7, the probability P(E) assigned to the focus example phrase E is read from the noun phrase translation example memory 8, and this and the transformation probability P(I|E) calculated in the step S32 are multiplied together. In this way, the translation suitability of the focus example phrase E with respect to the input phrase I is obtained.

After the translation suitability is obtained, proceeding to a step S34, the converting part 7 determines whether or not calculation of a translation suitability has been carried out for all the example phrases stored in the noun phrase translation example memory 8. When in the step S34 it is determined that calculation of a translation suitability has not been carried out for all the example phrases stored in the noun phrase translation example memory 8, processing returns to the step S31, an example phrase E for which a translation suitability has not yet been calculated is read out from the noun phrase translation example memory 8, and the processing of the step S32 and the subsequent steps is repeated with this as the focus example phrase E.

When on the other hand it is determined in the step S34 that calculation of a translation suitability has been carried out on all the example phrases stored in the noun phrase translation example memory 8, processing proceeds to a step S35, the example given the greatest translation suitability with respect to the input phrase I is detected in the converting part 7, and then processing ends.

Next, the transformation probability calculation processing of the step S32 of FIG. 12 will be described with reference to the flow charts of FIG. 13 and FIG. 14.

Figure 13:
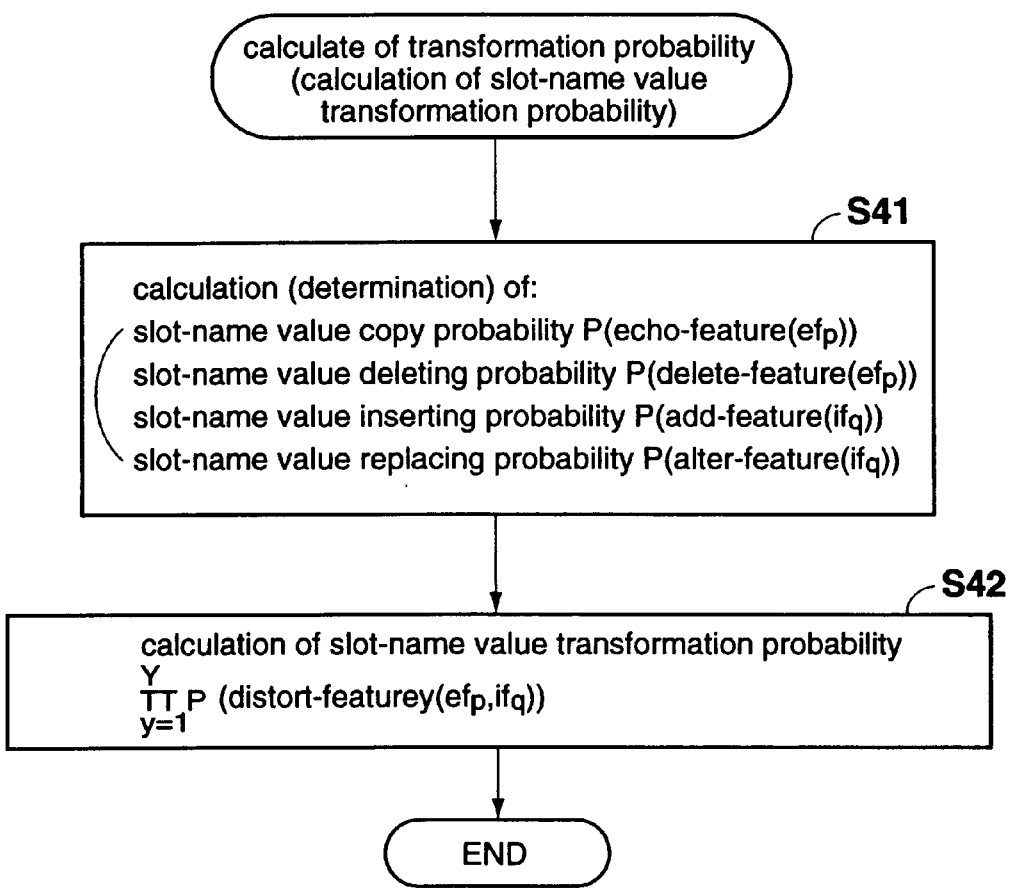
FIG. 13 is a flow chart illustrating details of the processing of a step S32 in FIG. 12.

First, FIG. 13 is a flow chart illustrating the slot-name value transformation probability calculation processing. The converting part 7 first in a step S41 compares the input phrase I to the focus example phrase E and obtains slot-name value copy probabilities, slot-name value deletion probabilities, slot-name value insertion probabilities and slot-name value replacement probabilities. Then, in a step S42, the converting part 7 obtains a slot-name value transformation probability by multiplying these together, whereupon processing ends.

Figure 14:
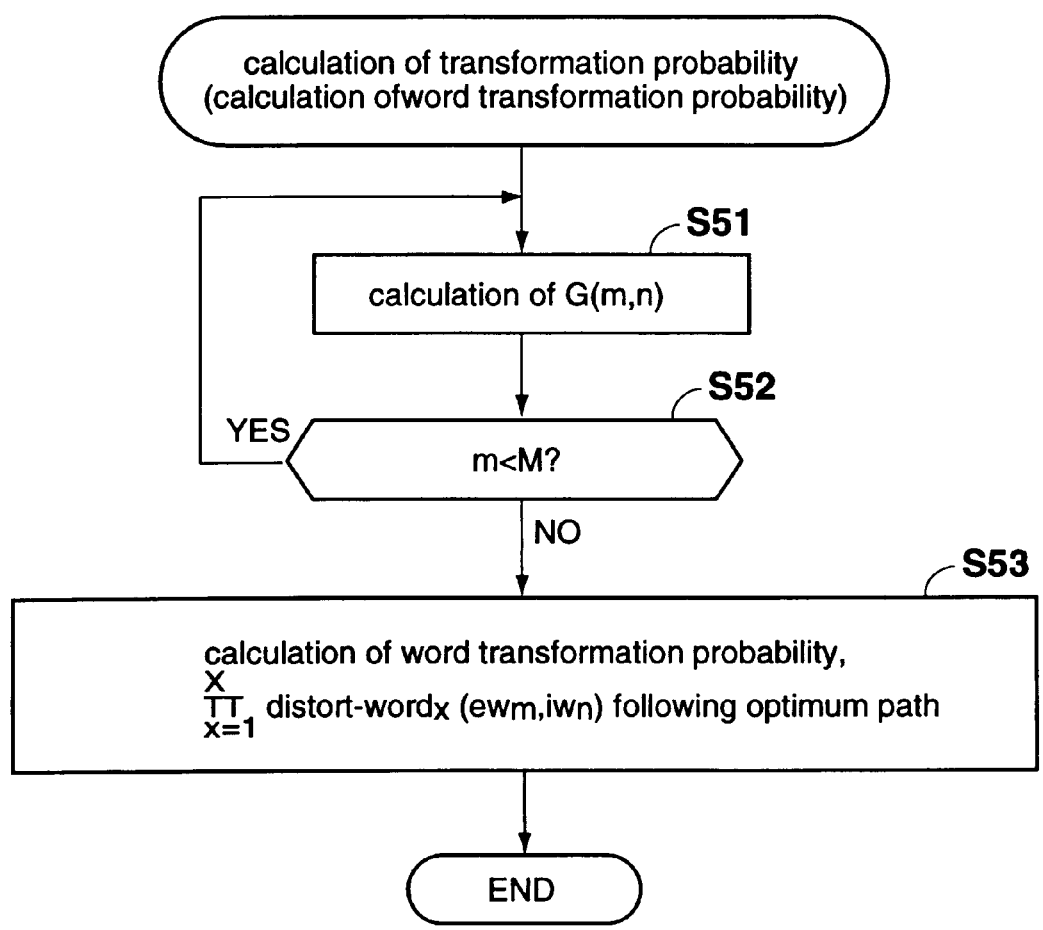
FIG. 14 is another flow chart illustrating details of the processing of the step S32 in FIG. 12.

FIG. 14 is a flow chart illustrating the word transformation probability calculation processing. The converting part 7 first in a step S51 obtains the cumulative distance G(m,n) between the input phrase I and the focus example phrase E according to Exp. (31) and then proceeds to a step S52 and determines whether or not m is less than M (the number of words constituting the focus example phrase E). When in the step S52 it is determined that m is less than M, processing returns to the step S51 and the converting part 7 increases m and calculates Exp. (31) while changing n. Then, in the step S52, when it is determined that m is not less than M, i.e. when m is equal to M, the path of when the cumulative distance G(m,n) was obtained, i.e. the optimum path, is detected and processing proceeds to a step S53.

In the step S53, in the converting part 7, the word transformation probability is calculated following the obtained optimum path. That is, word copy probabilities, word deletion probabilities, word insertion probabilities and word replacement probabilities are obtained and by these being multiplied together the word transformation probability is obtained. With respect to the word replacement probabilities, the converting part 7 controls the similarity degree calculating part 11 to calculate it according to Exp. (25). That is, the similarity degree calculating part 11 obtains the number of words included in a concept in the thesaurus stored in the thesaurus memory 12 common to a word of the input phrase I and a word constituting the focus example phrase E and on the basis of that number of words obtains a word similarity degree expressing the similarity in meaning between the two words, i.e. the word replacement probability obtained by calculating Exp. (25).

Figure 15:
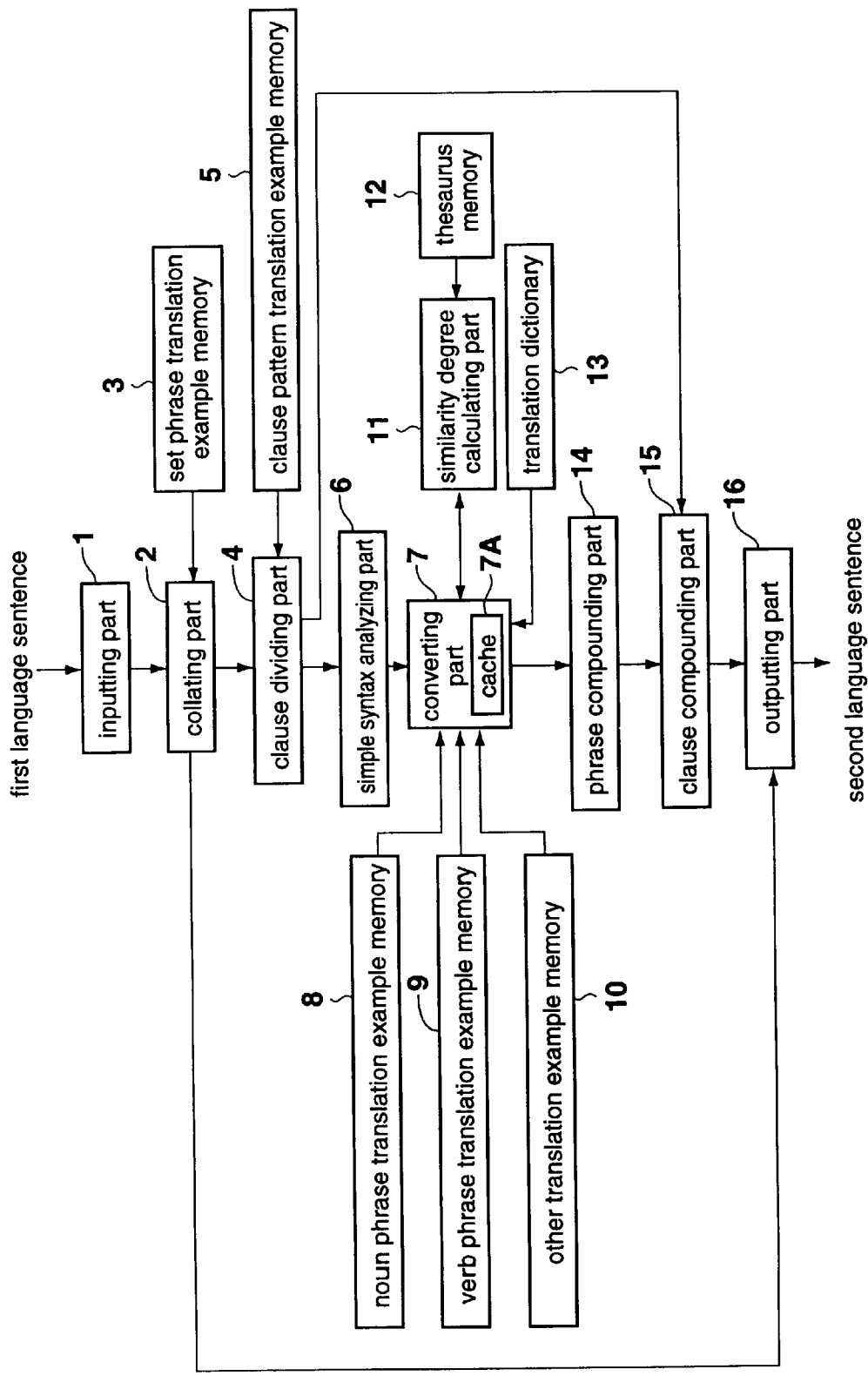
FIG. 15 is a block diagram showing an example of the construction of another preferred embodiment of a translating apparatus according to the invention.

Next, FIG. 15 shows the construction of another preferred embodiment of a translating apparatus according to the invention. Parts in FIG. 15 corresponding to parts shown in FIG. 5 have been given the same reference numerals and will not be described in the following. That is, except in that the converting part 7 has a cache 7A, this translating apparatus is basically constructed in the same way as that shown in FIG. 5.

The cache 7A temporarily stores provisionally deleted words and provisionally added words. The cache 7A is called a 'cache' only because it stores information temporarily like a cache memory disposed between a CPU and main memory, and it does not necessarily have to be a high-speed memory like an ordinary cache memory.

In the preferred embodiment described above, as transforming operators operating on words constituting an example phrase E, the word copying operator echo-word $(ew_m,iw_n)$, the word deleting operator delete-word$(ew_m)$, the word inserting operator add-word$(iw_n)$ and the word replacing operator alter-word$(ew_m,iw_n)$ were used, but with these four operators it is difficult to deal with cases where the example phrase E is transformed into the input phrase I just by the positions of the words of the example phrase E being changed (for example when the example phrase E is 'WATASHI WA MIKAN O TABETAI' ('I want to eat an orange') and is to be transformed into the input phrase I 'MIKAN O WATASHI WA TABETAI') ('an orange—I want to eat') and cases where the example phrase E is to be transformed into the input phrase I by words of the example phrase E being be replaced with words of the input phrase I and also having their positions changed (for example when the example phrase E is 'WATASHI WA MIKAN O TABETAI' ('I want to eat an orange') and is to be transformed into the input phrase I 'RINGO O WATASHI WA TABETAI' ('an apple—I want to eat')).

Also, in cases where there is included in the input phrase I a compound word (for example a compound noun) consisting of a word used as a modifier among the words of the input phrase I added to a word of the example phrase E (for example, when the example phrase E is 'DENWA O MITSUKERU' ('find a telephone') and the input phrase I is 'KOUSHUUDENWA O MITSUKERU' ('find a public telephone') and cases where there is included in the input phrase I a compound word consisting of a word used as a modifier among the words of the input phrase I added to a word of the example phrase E having been replaced with a word of the input phrase I (for example, when the example phrase E is 'DENWA O MITSUKERU' ('find a telephone') and the input phrase I is 'KOUSHUUTOIRE O MITSUKERU' ('find a public toilet')) it is necessary to make a word of the example phrase E correspond with a compound word of the input phrase I (in the above examples, 'DENWA' and 'KOUSHUUDENWA' ('telephone' and 'public telephone'), 'DENWA' and 'KOUSHUUTOIRE' ('telephone' and 'public toilet')), but this is difficult to do with the four operators mentioned above.

To overcome this, instead of the word deleting operator (an operator which irreversibly determines deletion at the time of its operation) delete-word$(ew_m)$, which actually deletes the word $ew_m$ of the example phrase E, a provisionally deleting operator which is an operator for deleting the word $ew_m$ provisionally will be introduced. Because this provisionally deleting operator temporarily removes (stores) the word being provisionally deleted (hereinafter referred to as the provisionally deleted word) $ew_m$ to the cache 7A, it will be written cache-as-deleted$(ew_m)$.

Also, instead of the word inserting operator add-word $(iw_n)$, which actually inserts the word $iw_n$ of the input phrase into the example phrase E (irreversibly determines insertion at that time), a provisionally inserting operator which is an operator for inserting that word $iw_n$ into the example phrase E provisionally will be introduced. Because this provisionally inserting operator temporarily removes the word $iw_n$ being provisionally inserted (hereinafter referred to as the provisionally inserted word) to the cache 7A, it will be written cache-as-added$(iw_n)$.

Also, a scrambling operator scramble$(ew_m,iw_n)$, which is an operator for copying unchanged a word $ew_m$ of the example phrase E as a word $iw_n$ which among the words of the input phrase I is not the word aligned with the word $ew_m$, or replacing the word $ew_m$ with such a word $iw_n$, i.e. changes only the position of a word of the example phrase E or replaces a word of the example phrase E with a word of the input phrase I and also changes its position, will be introduced.

Also, a compounding operator compound$(iw_{n-1},iw_n)$ which is an operator for identifying two consecutive words $iw_{n-1}$ and $iw_n$ of the input phrase I as constituting a compound word when those two words are a modifier and a modified word will be introduced. In this case, an operator for copying unchanged a word $ew_m$ of the example phrase E as a word $iw_n$ constituting the phrase input phrase I and making it form a compound word with the word $iw_{n-1}$ one word in front of it can be expressed as the combination of the word copying operator echo-word$(ew_m,iw_n)$ and the compounding operator compound$(iw_{n-1},iw_n)$ (hereinafter for convenience referred to as the copying and compounding operator). Also, an operator for replacing a word $ew_m$ of the example phrase E with a word $iw_n$ of the input phrase I and then making it form a compound word with the word $iw_{n-1}$ one word in front of it can be expressed as the combination of the word replacing operator alter-word$(ew_m,iw_n)$ and the compounding operator compound$(iw_{n-1},iw_n)$ (hereinafter for convenience referred to as the replacing and compounding operator).

In the preferred embodiment shown in FIG. 15, as operators operating on the words of the example phrase E, the six operators that are the word copying operator echo-word $(ew_m,iw_n)$, the word replacing operator alter-word$(ew_m, iw_n)$, the provisionally deleting operator cache-as-deleted $(ew_m)$, the provisionally inserting operator cache-as-added $(iw_n)$, the scrambling operator scramble$(ew_m,iw_n)$ and the compounding operator compound$(iw_{n-1},iw_n)$ are employed. Of these six operators, the compounding operator compound $(iw_{n-1},iw_n)$ only is not used alone and as described above is used as the copying and compounding operator or the replacing and compounding operator in combination with the word copying operator echo-word$(ew_m,iw_n)$ or the word replacing operator alter-word$(ew_m,iw_n)$.

Of the newly introduced operators, the provisionally deleting operator cache-as-deleted$(ew_m)$ and the provisionally inserting operator cache-as-added$(iw_n)$ can be used in the same ways as the word deleting operator delete-word $(ew_m)$ and the word inserting operator add-word$(iw_n)$ respectively (although in the point that they provisionally delete or insert words by storing the word in the cache 7A they differ from the word deleting operator delete-word $(ew_m)$ and the word inserting operator add-word$(iw_n)$, which irreversibly determine deletion or insertion of the word), but in the use of the scrambling operator scramble$(ew_m,iw_n)$ and the copying and compounding operator and the replacing and compounding operator there are the following kinds of limitation.

That is, transforming an example phrase E into an input phrase I by changing just the position of a word of the example phrase E or replacing a word of the example phrase E with a word of the input phrase I and then changing its position can be realized by either deleting the word whose position is to be changed and then inserting it in a predetermined position or by inserting the word whose position is to be changed in the predetermined position and then deleting the word in the original position.

Therefore, when transforming an example phrase E into an input phrase I, to change the position of a word it is necessary for that word to have been deleted from the example phrase E or inserted into the input phrase I in the past. Because of this, the scrambling operator scramble $(ew_m,iw_n)$ is only used when a word $ew_m$ of the example phrase E has been provisionally deleted or when a word $iw_n$ of the input phrase I has been provisionally inserted, ie. when a provisionally deleted word $ew_m$ or a provisionally inserted word $iw_n$ has been stored in the cache 7A.

Specifically, in calculating an optimum path, in a case where the transformation path from the mth word $ew_m$ of the example phrase E to the nth word $iw_n$ of the input phrase I is a problem, when a provisionally deleted word $ew_k$ (k<m) is stored in the cache 7A, it is possible to use the scrambling operator scramble($ew_k,iw_n$) (the nth word $iw_n$ of the input phrase I can be deemed to have been made not by transforming the mth word $ew_m$ of the example phrase E but by a transformation changing the position of the kth word $ew_k$ of the example phrase E, without changing the word or after replacing the word).

Also, in the case mentioned above, also when a provisionally inserted word $iw_s$ (s<n) is stored in the cache 7A, it is possible to use the scrambling operator scramble($ew_m,iw_n$) (the mth word $ew_m$ of the example phrase E can be deemed not to have been transformed into the nth word $iw_n$ of the input phrase I but to have been transformed into the sth word $iw_s$ of the input phrase I, either without being changed or after being replaced, by having its position changed).

When the scrambling operator scramble($ew_k,iw_n$) or the scrambling operator scramble($ew_m,iw_s$) has been used (when in the process of calculating the optimum path a transformation path corresponding to one of these has been selected), because at that time it is finally determined that the provisionally deleted word $ew_k$ or the provisionally inserted word $iw_s$ has not been deleted or inserted, that is, it is finally determined that its position has been changed, it is erased from the cache 7A.

Next, concerning the copying and compounding operator and the replacing and compounding operator, there are the following kinds of limitation on their use.

That is, to copy without changing it a word $ew_m$ of the example phrase E as a word $iw_n$ of the input phrase I and make it form a compound word with the word $iw_{n-1}$ one word in front of it, or to replace a word $ew_m$ of the example phrase E with a word $iw_n$ of the input phrase I and make it form a compound word with the word $iw_{n-1}$ one word in front of it, it is necessary for the word $iw_{n-1}$ serving as a modifier to have in the past been inserted into the input phrase I. Consequently, the copying and compounding operator and the replacing and compounding operator are used only when a word $iw_{n-1}$ of the input phrase I has been provisionally inserted in the past, i.e. when the provisionally inserted word $iw_{n-1}$ is stored in the cache 7A.

Specifically, in calculating the optimum path, when the transformation path from the mth word $ew_m$ of the example phrase E to the nth word $iw_n$ of the input phrase I is a problem, the copying and compounding operator and the replacing and compounding operator can be used when the provisionally inserted word $iw_{n-1}$ has been stored in the cache 7A, i.e. when the word $iw_{n-1}$ has been provisionally inserted in front of the word $iw_n$.

When the copying and compounding operator or the replacing and compounding operator has been used, because at that point in time it is finally determined that the provisionally inserted word $iw_{n-1}$ has not been inserted, i.e. it is finally determined that it constitutes a compound word, it is erased from the cache 7A.

Next, to obtain the word transformation probabilities of when transformation of words is carried out using these six transforming operators (the word copying operator echo-word($ew_m,iw_n$), the word replacing operator alter-word($ew_m,iw_n$), the provisionally deleting operator cache-as-deleted($ew_m$), the provisionally inserting operator cache-as-added($iw_n$), the scrambling operator scramble($ew_m,iw_n$) and the compounding operator compound($iw_{n-1},iw_n$)), probabilities of the transforming operators (probabilities of transformations using the transforming operators being carried out) are necessary, and these can be defined for example as follows.

That is, first, the probability (the word copying probability) P(echo-word($ew_m,iw_n$)) for the word copying operator echo-word($ew_m,iw_n$) and the probability (the word replacement probability) P(alter-word($ew_m,iw_n$)) for the word replacing operator alter-word($ew_m,iw_n$) are given by Exp. (22) and Exp. (25) respectively, as in the preferred embodiment described above.

Next, the probability (hereinafter for convenience referred to as the provisional deletion probability) P(cache-as-deleted($ew_m$)) for the provisionally deleting operator cache-as-deleted($ew_m$) is given for example using the word deletion probability P(delete-word($ew_m$)) and the word copy probability P(echo-word($ew_m,iw_n$)) so as to satisfy the following expression.

$$P(\text{delete-word}(ew_m)) < P(\text{cache-as-deleted}(ew_m)) < P(\text{echo-word}(ew_m,iw_n)) \qquad (32)$$

Here, the provisional deletion probability P(cache-as-deleted($ew_m$)) has a value satisfying Exp. (32) and for example lower than the word replacement probability P(alter-word($ew_m,iw_n$)) for a similar word and higher than the word replacement probability P(alter-word($ew_m,iw_n$)) for a dissimilar word.

The probability for the provisionally inserting operator cache-as-added($iw_n$) (hereinafter for convenience referred to as the provisional insertion probability) P(cache-as-added($iw_n$)) is given for example using the word insertion probability P(add-word($iw_n$)) and the word copy probability P(echo-word($ew_m,iw_n$)) so as to satisfy the following expression.

$$P(\text{add-word}(iw_n)) < P(\text{cache-as-added}(iw_n)) < P(\text{echo-word}(ew_m,iw_n)) \qquad (33)$$

Here, the provisional insertion probability P(cache-as-added($iw_n$)) has a value satisfying Exp. (33) and for example lower than the word replacement probability P(alter-word($ew_m,iw_n$)) for a similar word and higher than the word replacement probability P(alter-word($ew_m,iw_n$)) for a dissimilar word.

Also, when the word $ew_m$ is the same as the word $iw_n$, the word copy probability P(echo-word($ew_m,iw_n$)) in Exps. (32) and (33) is given by Exp. (22) (when the words $ew_m$ and $iw_n$ are not the same, because as mentioned above the word copy probability P(echo-word($ew_m,iw_n$)) becomes 0, in this case, the upper limit of the provisional deletion probability P(cache-as-deleted($ew_m$)) and the provisional insertion probability P(cache-as-added($iw_n$)) is not limited by the word copy probability P(echo-word($ew_m,iw_n$))).

The probability P(scramble($ew_m,iw_n$)) (hereinafter for convenience referred to as the scramble probability) for the scrambling operator scramble($ew_m,iw_n$) can be given by the following expressions.

$$P(\text{scramble}(ew_m,iw_n)) = f(P(\text{alter-word}(ew_m,iw_n)),iw_n) \text{ when } ew_m \neq iw_n$$
$$P(\text{scramble}(ew_m,iw_n)) = f(P(\text{echo-word}(ew_m,iw_n)),iw_n) \text{ when } ew_m = iw_n \qquad (35)$$

In Exp. (35), the function f( ) obtains the likelihood of occurrence of a phenomenon (scrambling) of the order of words or phrases and so on changing, and can be set taking into account for example the nature of the word stored in the cache 7A (for example its part of speech), the language of the input phrase I and the situation in which the input phrase I is being used. That is, the function f( ) can be set so as to give a higher probability with respect to input phrases I of Japanese, in which word order changes are freer than in English and the like, than to input phrases I of English. The function f( ) can also be set so as to give a higher probability with respect to spoken language, in which word order changes such as inversions are more likely to occur than in written language.

In Exp. (35), as the argument of the function f( ), when $ew_m \neq iw_n$ the word replacement probability P(alter-word $(ew_m, iw_n)$) is used; this is because when the words $ew_m$ and $iw_n$ are not the same (when $ew_m \neq iw_n$), it can be considered that the word of the example phrase E has been replaced and the word order has been changed, and when the words $ew_m$ and $iw_n$ are the same (when $ew_m = iw_n$) it can be considered that the word of the example phrase E has been copied without being changed and only the word order has been changed.

In Exp. (35), in both the cases of $ew_m \neq iw_n$ and $ew = iw_n$, as the argument of the function f( ), the word $iw_n$ of the input phrase I is used; this is because it can be supposed that the likelihood of a word order change varies depending on the word $iw_n$. That is, for example in Japanese there are almost no cases where a verb is moved to the beginning, and therefore when the word $iw_n$ is a verb it takes a value such that the scramble probability P(scramble($ew_m, iw_n$)) is small.

Next, the probability (hereinafter for convenience referred to as the compound probability) P(compound($iw_{n-1}, iw_n$)) is for example given by the following expression.

$$P(\text{compound}(iw_{n-1}, iw_n)) = g(iw_{n-1}, iw_n) \quad (36)$$

In Exp. (36), the function $g(iw_{n-1}, iw_n)$ expresses the probability of the consecutive words $iw_{n-1}$ and $iw_n$ forming a compound word, and this can be calculated for example in the following way. That is, it is possible for example to pre-store numerous examples of compound words and find the compound word most similar to the combination of the words $iw_{n-1}$, $iw_n$ and normalize its degree of similarity to obtain a probability of them forming a compound word.

When the degree of similarity between the combination and the stored compound word example is large enough, the compound probability P(compound($iw_{n-1}, iw_n$)) is higher than the word insertion probability P(add-word($iw_n$)).

The probability (hereinafter for convenience referred to as the copy and compound probability) of a word $ew_m$ of the example phrase E being copied as a word $iw_n$ of the input phrase I without being changed and forming a compound word together with the word in front of it is the product of the word copy probability P(echo-word($ew_m, iw_n$)) and the compound probability P(compound($iw_{n-1}, iw_n$)), and the probability (hereinafter for convenience referred to as the replace and compound probability) of a word $ew_m$ of the example phrase E being replaced with a word $iw_n$ of the input phrase I and forming a compound word together with the word in front of it is the product of the word replacement probability P(alter-word($ew_m, iw_n$)) and the compound probability P(compound($iw_{n-1}, iw_n$)).

With the six transforming operators of the word copying operator echo-word($ew_m, iw_n$), the word replacing operator alter-word($ew_m, iw_n$), the provisionally deleting operator cache-as-deleted($ew_m$), the provisionally inserting operator cache-as-added($iw_n$), the scrambling operator scramble ($ew_m, iw_n$) and the compounding operator compound($iw_{n-1}$, iwn) it is possible to carry out the following eight kinds of transformation.

That is, firstly, with the word copying operator echo-word ($ew_m, iw_n$), it is possible to make the word $ew_m$ of the example phrase E the word $iw_n$ of the input phrase I without changing it. Secondly, with the word replacing operator alter-word($ew_m, iw_n$), it is possible to replace the word $ew_m$ of the example phrase E with the word $iw_n$ of the input phrase I. Thirdly, with the provisionally deleting operator cache-as-deleted($ew_m$), it is possible to provisionally delete the word $ew_m$ of the example phrase E, and fourthly, with the provisionally inserting operator cache-as-added($iw_n$), it is possible to provisionally insert the word $iw_n$ of the input phrase I.

Also, with the scrambling operator scramble($ew_m, iw_n$), it is possible to carry out the following two word order changes. That is, fifthly, with the scrambling operator scramble($ew_k, iw_n$), it is possible to change the word order by inserting a provisionally deleted word $ew_k$ stored in the cache 7A as the nth word $iw_n$ of the input phrase I, and sixthly, with the scrambling operator scramble($ew_m, iw_s$), it is possible to make a provisionally inserted word $iw_s$ a change in the word order of the mth word $ew_m$ of the example phrase E.

Seventhly, with the combination (copying and compounding operator) of the word copying operator echo-word($ew_m$, $iw_n$) and the compounding operator compound($iw_{n-1}, iw_n$), it is possible without changing it to copy the word $ew_m$ of the example phrase E as the word $ew_m$ of the input phrase I and make it form a compound word with the word $iw_{n-1}$ one word in front of it, and eighthly, with the combination (replacing and compounding operator) of the word replacing operator alter-word($ew_m, iw_n$) and the compounding operator compound($iw_{n-1}, iw_n$), it is possible to replace the word $ew_m$ of the example phrase E with the word $iw_n$ of the input phrase I and make it form a compound word with the word $iw_{n-1}$ one word in front of it.

Considering finding the optimum set of transforming operators able to carry out these eight transformations, i.e. the optimum path, by means of DP matching, this can be done for example by a calculating cumulative distance G(m,n) using weightings of paths corresponding to the eight transformations shown in Exp. (37), similar to the case in Exp. (31).

$$G(m,n) = \min \begin{cases} G(m-1, n-1) - \log P(\text{echo} - \text{word}(ew_m, iw_n)) \\ G(m-1, n-1) - \log P(\text{alter} - \text{word}(ew_m, iw_n)) \\ G(m-1, n) - \log P(\text{cache} - \text{as} - \text{deleted}(ew_m)) \\ G(m, n-1) - \log P(\text{cache} - \text{as} - \text{added}(iw_n)) \\ G(m, n-1) - \log P(\text{scramble}(ew_k, iw_n)) \\ G(m-1, n) - \log P(\text{scramble}(ew_m, iw_s)) \\ G(m-1, n-1) - \log P(\text{echo} - \text{word}(ew_m, iw_n)) \\ \qquad - \log P(\text{compound}(iw_{n-1}, iw_n)) \\ G(m-1, n-1) - \log P(\text{alter} - \text{word}(ew_m, iw_n)) \\ \qquad - \log P(\text{compound}(iw_{n-1}, iw_n)) \end{cases} \quad (37)$$

In the preferred embodiment shown in FIG. 15, in the converting part 7, by calculating Exp. (37) until m=M, using the cache 7A as necessary, an optimum path is found and a word transformation probability is calculated.

Figure 16:
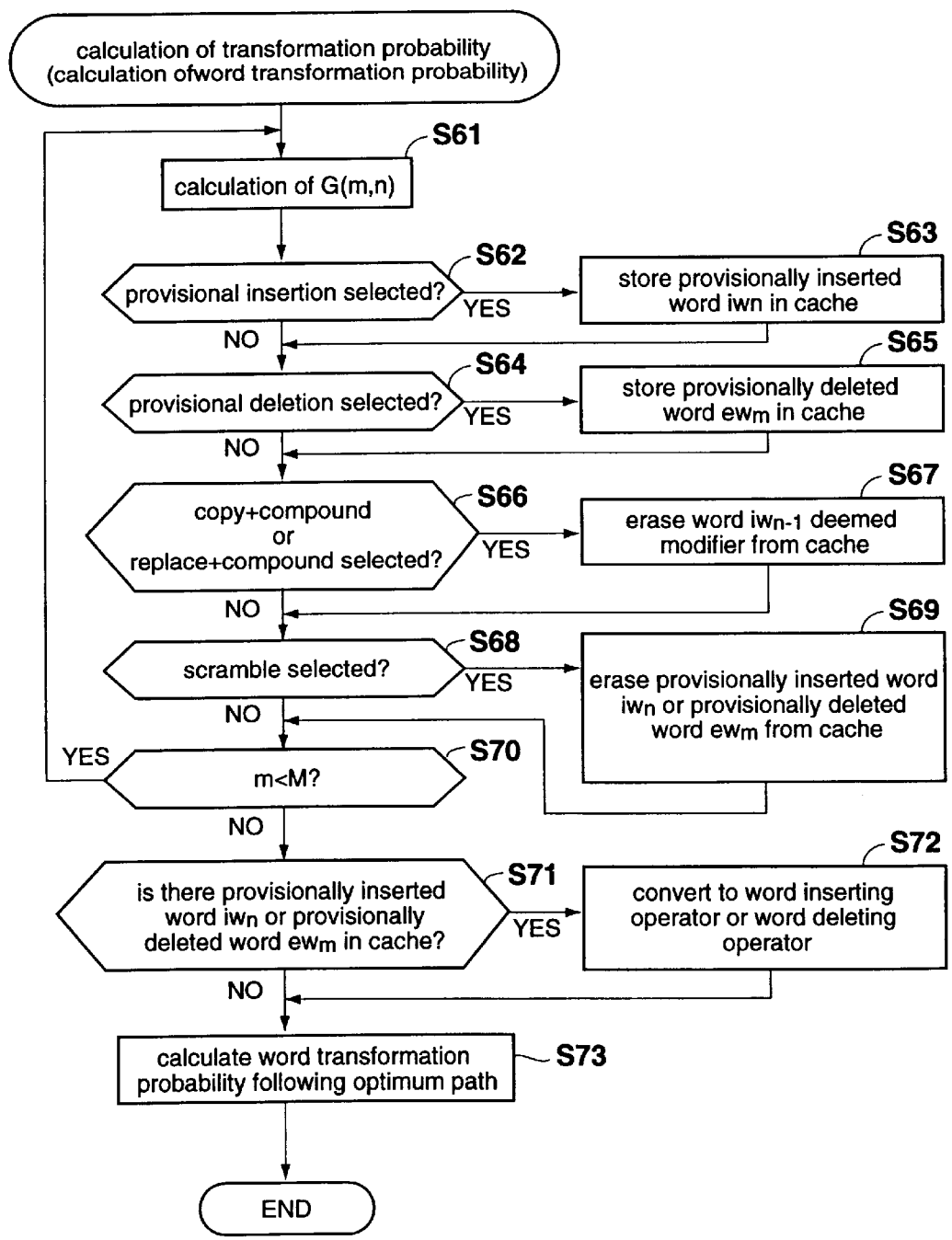
FIG. 16 is a flow chart illustrating processing carried out in the converting part 7 of FIG. 15.

That is, as shown in the flow chart of FIG. 16, in the converting part 7, first, in a step S61, according to Exp. (37), the cumulative distance G(m,n) of when the word $ew_m$ constituting a focus example phrase E is made to correspond with the word $iw_n$ of the input phrase I is found.

Then, proceeding to a step S62, it is determined whether or not in the calculation of the cumulative distance G(m,n) in the step S61 the path corresponding to the provisionally deleting operator cache-as-deleted($ew_m$), i.e. the third expression from the top on the right hand side in Exp. (37)

was selected, and when it is determined that it was selected processing proceeds to a step S63. In the step S63, the word $ew_m$ provisionally deleted by the provisionally deleting operator cache-as-deleted($ew_m$) is removed to (stored in) the cache 7A and processing proceeds to a step S64.

When in the step S62 it is determined that the path corresponding to the provisionally deleting operator cache-as-deleted($ew_m$) was not selected, the step S63 is skipped and processing proceeds to the step S64, wherein it is determined whether or not in the calculation of the cumulative distance G(m,n) the path corresponding to the provisionally inserting operator cache-as-added($iw_n$), i.e. the fourth expression from the top on the right hand side in Exp. (37), was selected. When in the step S64 it is determined that the path corresponding to the provisionally inserting operator cache-as-added($iw_n$) was selected, processing proceeds to a step S65 and the word $ew_m$ provisionally inserted by the provisionally inserting operator cache-as-added($iw_n$) is removed to the cache 7A, and processing proceeds to a step S66.

When in the step S64 it is determined that the path corresponding to the provisionally inserting operator cache-as-added($iw_n$) was not selected, processing skips the step S65 and proceeds to a step S66, wherein it is determined whether or not in the calculation of the cumulative distance G(m,n) a path corresponding to the copying and compounding operator or the replacing and compounding operator, i.e. the expression on the seventh line or the eighth line from the top on the right side in Exp. (37), was selected. When in the step S66 it is determined that a path corresponding to the copying and compounding operator or the replacing and compounding operator was selected, processing proceeds to a step S67, and because a provisionally deleted word $iw_{n-1}$ made a modifier constituting a compound word by the copying and compounding operator or the replacing and compounding operator is stored in the cache 7A this is erased and processing proceeds to the step S68.

When in the step S66 it is determined that neither of the paths corresponding to the copying and compounding operator or the replacing and compounding operator was selected, processing skips the step S67 and proceeds to the step S68 and it is determined whether or not in the calculation of the cumulative distance G(m,n) a path corresponding to the scrambling operator scramble($ew_k,iw_n$) or the scrambling operator scramble($ew_m,iw_s$), i.e. the expression on the fifth or the sixth line from the top on the right-side in Exp. (37) was selected. When in the step S68 it is determined that a path corresponding to the scrambling operator scramble($ew_k,iw_n$) or the scrambling operator scramble($ew_m,iw_s$) was selected, processing proceeds to a step S69 wherein because a provisionally deleted word $ew_k$ or a provisionally inserted word $iw_s$ is stored in the cache 7A this is erased, and then proceeds to a step S70.

When on the other hand in the step S68 it is determined that neither of the paths corresponding to the scrambling operators scramble($ew_k,iw_n$) or scramble($ew_m,iw_s$) were selected, processing skips the step S69 and proceeds to the step S70, wherein it is determined whether or not m is less than M (the number of words constituting the focus example phrase E). When it is determined that m is less than M, processing returns to the step S61 and the converting part 7 increases m and n and repeats the subsequent processing. When in the step S70 it is determined that m is less than M, i.e. m is equal to M, processing proceeds to a step S71 and it is determined whether or not a provisionally deleted word $ew_m$ or a provisionally inserted word $iw_n$ is stored in the cache 7A.

When in the step S71 it is determined that a provisionally deleted word $ew_m$ or a provisionally inserted word $iw_n$ is stored in the cache 7A, processing proceeds to a step S72 and, among the paths of when the cumulative distance G(M,n) was obtained, the path corresponding to the provisionally deleting operator cache-as-deleted($ew_m$) having provisionally deleted the provisionally deleted word $ew_m$ stored in the cache 7A or the path corresponding to the provisionally inserting operator cache-as-added($iw_n$) having provisionally inserted the provisionally inserted word $iw_n$ stored in the cache 7A is respectively converted into the path corresponding to a word deleting operator delete-word($ew_m$) or a path corresponding to the word inserting operator add-word($iw_n$) and the path obtained as a result is taken as the optimum path, and processing proceeds to a step S73.

When in the step S71 it is determined that neither a provisionally deleted word $ew_m$ nor a provisionally inserted word $iw_n$ is stored in the cache 7A, the path of when the cumulative distance G(M,n) was obtained is taken unchanged as the optimum path, processing proceeds to the step S73 and the word transformation probability is calculated following this optimum path.

In this case, the optimum path includes a path corresponding to the provisionally deleting operator cache-as-deleted ($ew_m$) or the provisionally inserting operator cache-as-added ($iw_n$) respectively having provisionally deleted or provisionally inserted the provisionally deleted word $ew_m$ or the provisionally inserted word $iw_n$ erased from the cache 7A, but this path can be ignored in calculating the word transformation probability.

As a result of the scrambling operator scramble($ew_m,iw_n$) being introduced together with the provisionally deleting operator cache-as-deleted($ew_m$) and the provisionally inserting operator cache-as-added($iw_n$), as described above, even when there is a difference in word order between an input phrase I and an example phrase E which are similar, it becomes possible to determine their similarity correctly.

Also, as a result of the compounding operator compound ($iw_{n-1},iw_n$) being introduced, it becomes possible to handle compound words as well.

A calculating method using memory means like the cache 7A for temporarily storing provisionally deleted words and provisionally inserted words is applied to language models for voice recognition in for example "A Cache-based Natural Language Model for Speech Recognition", Roland Kuhn and Renato De Mori, IEEE Transactions on Pattern Analysis and Machine Intelligence, vol.12, No.6, June 1990.

Here, a language model based on the hypothesis that the probability of a recently-used word appearing (being spoken) again is higher than the probability of that word first appearing is proposed, wherein recently-used words are stored in memory means and the probability of an ith word $W_i$ being a predetermined word W is calculated with reference to this memory means.

That is, for example in an ordinary 3g-gram model, when the parts of speech of the i-1th and i-2th words are respectively written $g_{i-1}$ and $g_{i-2}$, the probability $P(W_i=W|g_{i-2},g_{i-1})$ of the ith word $W_i$ being a predetermined word W is calculated for example using the following expression.

$$P(W_i = W \mid g_{i-2}, g_{i-1}) = \sum_{g_i \in G} P(W_i = W \mid g_i = g_j) P(g_i = g_j \mid g_{i-2}, g_{i-1}) \quad (38)$$

Here, G is a set of parts of speech in the language that is the object of the voice recognition.

In the aforementioned literature, a method of calculating the $P(W_i=W|g_i=g_j)$ on the right side of Exp. (38) according to the following Exp. (39) by storing recently-used words in storing means is proposed.

$$P(W_i=W|g_i=g_j) \approx k_{M,j} \times f(W_i=W|g_i=g_j) + k_{c,j} \times C_j(W,i) \qquad (39)$$

Here, $k_{M,j}+k_{c,j}=1$ and $k_{M,j}$ and $k_{c,j}$ are both variables indexed only by j.

The $C_j(W,i)$ on the right side of Exp. (39) is a probability calculated by referring to the memory means, and changes depending on whether the word W has appeared recently.

Therefore, the means in the preferred embodiment shown in FIG. 15 has something in common with the means of the aforementioned literature, wherein words are stored in memory means and probabilities are calculated with reference to that, in the point that words are stored in the cache 7A and probabilities are calculated with reference to this; however, it differs from the means of the aforementioned literature, wherein words having appeared recently are stored in the storing means, in that only provisionally deleted words and provisionally inserted words are stored in the cache 7A.

With the compounding operator compound($iw_{n-1},iw_n$), as well as it being possible to handle compound nouns of the kind mentioned above, it is possible for example to handle such times as when the example phrase E is 'INU WA KAWAII' ('dogs are cute') and the input phrase I is 'WATASHI NO INU WA KAWAII' ('my dog is cute') and a compound word 'WATASHI NO INU' ('my dog') made up of the modifier 'WATASHI NO' ('my') added to the word 'INU' ('dog') of the input phrase I corresponds to the word 'INU' of the example phrase E. However, in cases such as 'WATASHI NO INU' ('my dog') wherein it is clear that 'WATASHI NO' ('my') modifies 'INU' ('dog'), by applying the replacing operator alter-word('INU','WATASHI NO INU') to the 'INU' of the example phrase E and the 'WATASHI NO INU' of the input phrase I and using a noun phrase example 'WATASHI NO X' ('my X') (where X represents a noun), it is possible to process the phrase correctly and more efficiently than when the compounding operator compound($iw_{n-1},iw_n$) is used.

That is, the compounding operator compound($iw_{n-1},iw_n$) is effective in cases such as when a compound word of which the modifying relationship is unclear, for example one not containing the (possessive) particle 'NO' (for example a compound noun) is inputted into the inputting part 1, or when in a voice recognition device in the inputting part 1 a particle is not recognized and for example 'WATASHI, INU WA KAWAII' is outputted from the inputting part 1 with respect to an actual input of 'WATASHI NO INU WA KAWAII'.

In the above, a case wherein the invention is applied to a translating apparatus for carrying out translation from Japanese into English was described, but the invention can also be applied to translating apparatuses for performing translation between other languages.

It is possible to provide the translating apparatus with buttons for correcting and confirming translation results outputted from the outputting part 16 (hereinafter for convenience referred to respectively as the correction button and the confirmation button). The translating apparatus can be made to carry out subsequent processing when the confirmation button is operated confirming that the translation result is correct. Also, the translating apparatus can be made to carry out translation processing again when the correction button is operated indicating that the translation result is wrong. That is, for example, the translating apparatus can be made to detect the next highest translation suitability and carry out translation on the basis of that example. Furthermore, it is also possible to provide the translating apparatus with a control part for correcting translation results outputted from the outputting part 16. In this case, when translation results have been corrected by the control part being operated, it is possible to store examples corresponding to the results of this correction in the noun phrase translation example memory 8, the verb phrase translation example memory 9 or the other translation example memory 10.

Although in the preferred embodiments described above a priori probability $P(E_i)$ was found for each example $E_i$ for example according to Exp. (5) or as described above with reference to 11, for this priori probability $P(E_i)$ it is also possible to use the same value, for example the inverse $1/N_E$ of the number of examples $N_E$, for all the examples $E_i$.

In these preferred embodiments, in the similarity degree calculating part 11, the word replacement probability was found on the basis of the number of words included in a concept common to the two words concerned, but it is also possible for the word replacement probability to be found on the basis of the level of the class to which the concept common to the two words belongs in the thesaurus, as in the related art. That is, when the number of classes of the thesaurus is written C and the level of the class to which the concept common to a word $iw_n$ of an input phrase I and a word $ew_m$ of an example phrase E belongs is written L, it is possible to find the word replacement probability P(alter-word($ew_m,iw_n$)) according to the following expression.

$$P(\text{alter} - \text{word}(ew_m, iw_n)) \approx \frac{1}{2^{C-L}} \qquad (40)$$

Also, although in the preferred embodiments the word deletion probability and so on were determined on the basis of the part of speech of the word (whether the word is an independent word or a functional word, and so on), depending on the domain in which the translating apparatus is to be used there are cases in which it is effective to determine them on the basis of information other than the part of speech. That is, it is possible to determine the word deletion probability and so on taking into consideration factors such as that in spoken language pronouns of the first and second person and so on tend to be omitted and that words conveying a topic in context tend to be omitted because the topic is clear to the people talking.

Also, it is possible to give the word insertion probability and the word deletion probability a predetermined constant value to apply in all cases, as shown in Exps. (41) and (42) respectively.

$$P(\text{add-word}(iw_n)) \approx \text{add-word} \qquad (41)$$

$$P(\text{delete-word}(ew_m)) \approx \text{delete-word} \qquad (42)$$

The word deletion probability and so on can also be given according to a predetermined calculation formula.

Although in the preferred embodiments translation was carried out in clause or phrase units, it is also possible for translation to be carried out in other syntax units. It is also possible for translation to be carried out without the first language sentence being divided into such syntax units. Furthermore, although in the preferred embodiments described above the example phrases were stored classified into noun phrases, verb phrases and other phrases, the method of classification is not limited to this.

As described above, in a translating apparatus and a translating method according to the invention, a first language sentence is divided into syntax units consisting of predetermined units of sentence structure and examples similar to these syntax units of the first language sentence are detected. Then, on the basis of these detected examples, the first language sentence is translated in syntax units and the results of translation of the syntax units are compounded to generate a second language sentence. Therefore, efficient translation processing becomes possible and as a result the translation processing speed can be increased.

In another translating method according to the invention, the first language sentence is divided into syntax units consisting of predetermined units of sentence structure, in stages from large syntax units into small syntax units, and the syntax units obtained at each stage are collated with examples, and examples corresponding to the syntax units are detected on the basis of the results of this collation. The first language sentence is then translated in syntax units on the basis of translations corresponding to these detected examples, and the results of translation of the syntax units are compounded to generate a second language sentence. Therefore, efficient translation processing becomes possible and as a result the translation processing speed can be increased.

In another translating apparatus and translating method according to the invention, a degree of similarity expressing the similarity between a word of a first language sentence and a word of an example is calculated on the basis of the number of words included in a concept common to the word of the first language sentence and the word of the example in a thesaurus wherein words are classified in a tree structure on the basis of their concepts. Therefore, it becomes possible to calculate an accurate degree of similarity irrespective of the structure of the thesaurus and as a result the translation processing speed can be increased.

In another translating apparatus and another translating method according to the invention, an example similar to a first language sentence is detected on the basis of a priori probability of the example being used to translate the first language sentence and a transformation probability of the example being transformed into the first language sentence and used, and the first language sentence is translated on the basis of a translation corresponding to the detected example. Therefore, it is possible to perform translation processing which is suitable in terms of probability.

In another translating apparatus and translating method according to the invention, by syntax analysis being performed on a first language sentence, grammatical attributes of the sentence are extracted and an example similar to the first language sentence is detected taking into account grammatical attributes of the first language sentence and of the example. The first language sentence is then translated on the basis of a translation corresponding to the detected example. Therefore, it becomes unnecessary to store multiple superficially different examples having the same meaning content.

Various other modifications and application examples are of the invention are conceivable within the scope of the invention. Therefore, the invention is not limited to the preferred embodiments described above.

What is claimed is:

1. A translating method for translating a first language sentence expressed in a first language into a second language sentence expressed in a second language using example memory means storing examples expressed in said first language and corresponding translations of said examples in said second language, comprising the steps of:

detecting from among said examples an example similar to said first language sentence on the basis of a priori probability of said example being used for translating said first language sentence and a transformation probability of said example being transformed into said first language sentence and used; and translating said first language sentence on the basis of a translation among said translations corresponding to said example detected.

2. A translating apparatus for translating a first language sentence expressed in a first language into a second language sentence expressed in a second language, comprising:

example memory means storing examples expressed in said first language and corresponding translations of said examples in said second language;

detecting means for detecting from among said examples an example similar to said first language sentence on the basis of a priori probability of said example being used for translating said first language sentence and a transformation probability of said example being transformed into said first language sentence and used; and translating means for translating said first language sentence on the basis of a translation among said translations corresponding to said example detected by said detecting means.

3. A translating apparatus according to claim 2, wherein said transformation probability is calculated from a grammatical attribute transformation probability of grammatical attributes of said example being transformed and a word transformation probability of words of said example being transformed.

4. A translating apparatus according to claim 3, wherein said grammatical attribute transformation probability is calculated from a grammatical attribute copy probability of a grammatical attribute of said example being used unchanged, a grammatical attribute deletion probability of a grammatical attribute of said example being deleted, a grammatical attribute addition probability of a grammatical attribute of said first language sentence being added, and a grammatical attribute replacement probability of a grammatical attribute of said example being replaced with a grammatical attribute of said first language sentence.

5. A translating apparatus according to claim 3, wherein said word transformation probability is calculated from a word copy probability of a word of said example being used unchanged, a word deletion probability of a word of said example being deleted, a word addition probability of a word of said first language sentence being added, and a word replacement probability of a word of said example being replaced with a word of said first language sentence.

6. A translating apparatus according to claim 5, wherein said word transformation probability is calculated further using at least one among a word scramble probability of a word of said example unchanged or replaced with a word of said first language sentence being used with its position changed, a word copy and compound probability of a word of said example having a modifier added thereto and being used as a compound word, and a word replace and compound probability of a word of said example replaced with a word of said first language sentence having a modifier added thereto and being used as a compound word.

7. A translating apparatus according to claim 5, wherein said word transformation probability is calculated according to an optimum transformation path for transforming said example into said first language sentence.

8. A translating apparatus according to claim 7, wherein in finding said optimum transformation path instead of an actual deletion path corresponding to actually deleting a word of said example a provisional deletion path provisionally deleting a word of said example is used and instead of an actual addition path corresponding to actually adding a word of said first language sentence a provisional addition path provisionally adding a word of said first language sentence is used, further comprising word memory means for storing a provisionally deleted word and a provisionally added word provisionally deleted or added according to said provisional deletion path or said provisional addition path.

9. A translating apparatus according to claim 8, wherein a scramble path corresponding to using a word of said example unchanged or replaced with a word of said first language sentence with its position changed is selected only when either a word of said example has been stored in said word memory means as said provisionally deleted word or a word of said first language sentence has been stored in said word memory means as said provisionally added word, and thereafter said word of said example stored as said provisionally deleted word or said word of said syntax unit stored as said provisionally added word is erased from said word memory means, and a copy and compound path corresponding to a word of said example having a modifier added thereto and being used as a compound word and a replace and compound path corresponding to a word of said example replaced with a word of said first language sentence having a modifier added to it and being used as a compound word are selected only when a word to become said modifier has been stored in said word memory means as said provisionally added word, and thereafter said word to become a modifier stored as said provisionally added word is erased from said word memory means.

10. A translating apparatus according to claim 9, wherein after the end point of a transformation path transforming said example into said first language sentence is reached a provisional deletion path or a provisional addition path provisionally deleting or adding said provisionally deleted word or said provisionally added word stored in said word memory means is converted into an actual deleting path or an actual addition path respectively and the path obtained is made the optimum transformation path.

11. A translating apparatus according to claim 2, wherein said word transformation probability is calculated according to an optimum transformation path for transforming said example into said first language sentence.

12. A translating apparatus according to claim 11, wherein said optimum transformation path is found by dynamic programming.

13. A translating apparatus for translating a first language sentence expressed in a first language into a second language sentence expressed in a second language, comprising:

example memory means storing examples expressed in said first language and corresponding translations of said examples in said second language;

dividing means for dividing said first language sentence into syntax units consisting of predetermined units of sentence structure;

detecting means for detecting for each of said syntax units of said first language sentence outputted by said dividing means an example similar to that syntax unit from among said examples;

translating means for translating said first language sentence in said syntax units on the basis of those of said translations corresponding to those of said examples detected by said detecting means; and generating means for generating said second language sentence by compounding results of translation of said syntax units obtained by said translating means;

wherein said detecting means detects said example similar to said syntax unit on the basis of a priori probability of said example being used to translate said syntax unit and a transformation probability of said example being transformed into said syntax unit and used.

14. A translating apparatus according to claim 13, wherein said transformation probability is calculated from a grammatical attribute transformation probability of grammatical attributes of said example being transformed and a word transformation probability of words of said example being transformed.

15. A translating apparatus according to claim 14, wherein said grammatical attribute transformation probability is calculated from a grammatical attribute copy probability of a grammatical attribute of said example being used unchanged, a grammatical attribute deletion probability of a grammatical attribute of said example being deleted, a grammatical attribute addition probability of a grammatical attribute of said syntax unit being added, and a grammatical attribute replacement probability of a grammatical attribute of said example being replaced with a grammatical attribute of said syntax unit.

16. A translating apparatus according to claim 14, wherein said word transformation probability is calculated from a word copy probability of a word of said example being used unchanged, a word deletion probability of a word of said example being deleted, a word addition probability of a word of said syntax unit being added, and a word replacement probability of a word of said example being replaced with a word of said syntax unit.

17. A translating apparatus according to claim 16, further comprising:

thesaurus memory means storing a thesaurus wherein words are classified in a tree structure on the basis of their concepts; and word similarity degree calculating means for calculating a word similarity degree expressing a similarity between a word of said syntax unit and a word of said example on the basis of said thesaurus and outputting said word similarity degree as said word replacement probability.

18. A translating apparatus according to claim 17, wherein said word similarity degree calculating means calculates said word similarity degree on the basis of the number of words included in a concept common to said word of said syntax unit and said word of said example in said thesaurus.

19. A translating apparatus according to claim 16, wherein said word transformation probability is calculated further using at least one among a word scramble probability of a word of said example unchanged or replaced with a word of said syntax unit being used with its position changed, a word copy and compound probability of a word of said example having a modifier added thereto and being used as a compound word, and a word replace and compound probability of a word of said example replaced with a word of said syntax unit having a modifier added thereto and being used as a compound word.

20. A translating apparatus according to claim 19, wherein said word transformation probability is calculated according to an optimum transformation path for transforming said example into said syntax unit.

21. A translating apparatus according to claim 20, wherein in finding said optimum transformation path instead of an actual deletion path corresponding to actually deleting a word of said example a provisional deletion path provisionally deleting a word of said example is used and instead of an actual addition path corresponding to actually adding a word of said syntax unit a provisional addition path provisionally adding a word of said syntax unit is used, further comprising word memory means for storing a provisionally deleted word and a provisionally added word provisionally deleted or added according to said provisional deletion path or said provisional addition path.

22. A translating apparatus according to claim 21, wherein a scramble path corresponding to using a word of said example unchanged or replaced with a word of said syntax unit with its position changed is selected only when either a word of said example has been stored in said word memory means as said provisionally deleted word or a word of said syntax unit has been stored in said word memory means as said provisionally added word, and thereafter said word of said example stored as said provisionally deleted word or said word of said syntax unit stored as said provisionally added word is erased from said word memory means, and a copy and compound path corresponding to a word of said example having a modifier added thereto and being used as a compound word and a replace and compound path corresponding to a word of said example replaced with a word of said syntax unit having a modifier added to it and being used as a compound word are selected only when a word to become said modifier has been stored in said word memory means as said provisionally added word, and thereafter said word to become a modifier stored as said provisionally added word is erased from said word memory means.

23. A translating apparatus according to claim 22, wherein after the end point of a transformation path transforming said example into said syntax unit is reached a provisional deletion path or a provisional adding path provisionally deleting or adding said provisionally deleted word or said provisionally added word stored in said word memory means is converted into an actual deleting path or an actual adding path respectively and the path obtained is made said optimum transformation path.

24. A translating apparatus according to claim 14, wherein said word transformation probability is calculated according to an optimum transformation path for transforming said example into said syntax unit.

25. A translating apparatus according to claim 24, wherein said optimum transformation path is found by dynamic programming.

26. A translating apparatus according to claim 13, wherein said priori probability or said transformation probability is calculated on the basis of corpus data.

27. A translating apparatus according to claim 13, wherein said priori probability or said transformation probability is calculated on the basis of said examples stored in said example memory means.

* * * * *